US012760200B2

(12) United States Patent
Nose et al.

(10) Patent No.: US 12,760,200 B2
(45) **Date of Patent: *Oct. 13, 2026**

(54) SURFACE TREATMENT AGENT

(71) Applicant: DAIKIN INDUSTRIES, LTD., Osaka (JP)

(72) Inventors: Masatoshi Nose, Osaka (JP); Hisashi Mitsuhashi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 821 days.

This patent is subject to a terminal disclaimer.

(21) Appl. No.: 17/196,009

(22) Filed: Mar. 9, 2021

(65) Prior Publication Data

US 2021/0206994 A1 Jul. 8, 2021

Related U.S. Application Data

(63) Continuation of application No. PCT/JP2019/035035, filed on Sep. 5, 2019.

(30) Foreign Application Priority Data

Sep. 28, 2018 (JP) ................................ 2018-185812

(51) Int. Cl.

*C09D 171/02* (2006.01)
*B05D 1/00* (2006.01)
*C08G 65/00* (2006.01)
*C08G 65/333* (2006.01)
*C08G 65/336* (2006.01)

(52) U.S. Cl.

CPC ............ *C09D 171/02* (2013.01); *B05D 1/60* (2013.01); *C08G 65/007* (2013.01); *C08G 65/33317* (2013.01); *C08G 65/336* (2013.01); *B05D 2401/30* (2013.01); *C08G 2650/20* (2013.01); *C08G 2650/48* (2013.01)

(58) Field of Classification Search

None
See application file for complete search history.

(56) References Cited

U.S. PATENT DOCUMENTS

| | | | | |
|---|---|---|---|---|
| 11,118,085 B2 * | 9/2021 | Nose | .................... | C09D 171/02 |
| 2018/0171144 A1 | 6/2018 | Honda et al. | | |
| 2019/0031828 A1 * | 1/2019 | Ishii | .................... | C09D 127/22 |
| 2019/0322893 A1 | 10/2019 | Nose et al. | | |
| 2020/0024241 A1 | 1/2020 | Yamashita et al. | | |
| 2020/0157376 A1 | 5/2020 | Hoshino et al. | | |

FOREIGN PATENT DOCUMENTS

| | | | | |
|---|---|---|---|---|
| CN | 106432686 A | 2/2017 | | |
| WO | 2016/199908 A1 | 12/2016 | | |
| WO | WO-2017130973 A1 * | 8/2017 | ............ | C03C 17/28 |
| WO | 2018/056410 A1 | 3/2018 | | |
| WO | 2018/056413 A1 | 3/2018 | | |
| WO | 2019/039186 A1 | 2/2019 | | |

OTHER PUBLICATIONS

Extended European Search Report dated May 24, 2022 from the European Patent Office in EP Application No. 19866229.8.
International Preliminary Report on Patentability with translation of the Written Opinion dated Apr. 8, 2021, in International Application No. PCT/JP2019/035035.
International Search Report of PCT/JP2019/035035 dated Dec. 3, 2019 [PCT/ISA/210].

* cited by examiner

*Primary Examiner* — Ramsey Zacharia
(74) *Attorney, Agent, or Firm* — Sughrue Mion, PLLC

(57) ABSTRACT

A surface-treating agent including (I) a compound represented by the following formula (I-1) or formula (I-2) and (II) a perfluoropolyether group-containing silane compound having an $OCF_2$ unit:

(I-1)

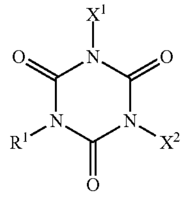

(I-2)

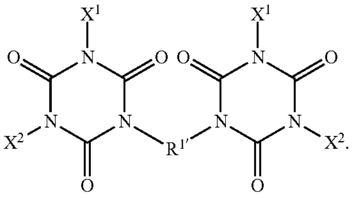

15 Claims, No Drawings

SURFACE TREATMENT AGENT

This is a Continuation Application under 37 C.F.R. § 1.53(b) of International Application No. PCT/JP2019/035035 filed Sep. 5, 2019, which claims priority from Japanese Patent Application No. 2018-185812 filed Sep. 28, 2018. The above noted applications are incorporated herein by reference in their respective entireties.

TECHNICAL FIELD

The present disclosure relates to a surface-treating agent containing a perfluoropolyether group-containing compound.

BACKGROUND ART

It is known that certain fluorine-containing silane compounds can provide excellent water-repellency, oil-repellency, antifouling property, or the like when used for the surface treatment of a base material. A layer obtained from a surface-treating agent containing a fluorine-containing silane compound (hereinafter, also referred to as "surface-treating layer") is applied as a so-called functional thin film to a variety of base materials such as glass, plastics, fibers and construction materials, for example.

As such a fluorine-containing silane compound, for example, perfluoropolyether group-containing silane compounds having an isocyanuric nucleus with a perfluoropolyether group and Si atoms having a hydrolyzable group, as disclosed in Patent Literature 1 and 2, are known (Patent Literature 1 and 2).

CITATION LIST

Patent Literature

Patent Literature 1: International Publication No. WO2018/056410

Patent Literature 2: International Publication No. WO2018/056413

SUMMARY

A surface-treating agent comprising:

(I) a compound represented by the following formula (I-1) or formula (I-2):

(I-1)

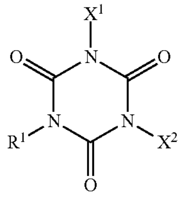

(I-2)

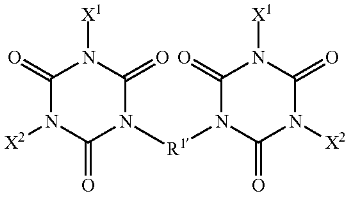

wherein:

$R^1$ is a monovalent organic group containing a polyether chain;

$R^{1'}$ is a divalent organic group containing a polyether chain;

the polyether chain is a chain represented by the formula:

$$-(OC_6F_{12})_{m11}-(OC_5F_{10})_{m12}-(OC_4F_8)_{m13}-(OC_3X^{10}_6)_{m14}-(OC_2F_4)_{m15}-(OCF_2)_{m16}-$$

wherein m11, m12, m13, m14, m15 and m16 are each independently 0 or an integer of 1 or more;

$X^{10}$ is independently H, F or Cl; and the occurrence order of the respective repeating units is not limited;

$X^1$ is independently a silane-containing reactive crosslinkable group; and $X^2$ independently represents a monovalent group; and II a perfluoropolyether group-containing silane compound having an $OCF_2$ unit.

Advantageous Effect

By using the surface-treating agent of the present disclosure, it is possible to form a surface-treating layer having, in addition to excellent water-repellency, weather resistance, surface lubricity, eraser durability, and SW friction durability in good balance.

DESCRIPTION OF EMBODIMENTS

Hereinafter, a surface-treating agent of the present disclosure will be specifically described.

The surface-treating agent of the present disclosure comprises (I) an isocyanuric compound represented by formula (I-1) or formula (I-2); and (II) a perfluoropolyether group-containing silane compound having an $OCF_2$ unit.

(I) Isocyanuric compound represented by formula (I-1) or formula (I-2) (hereinafter, also referred to as "compound α")

The compound I is a compound represented by formula (I-1) or formula (I-1):

(I-1)

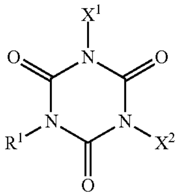

(I-2)

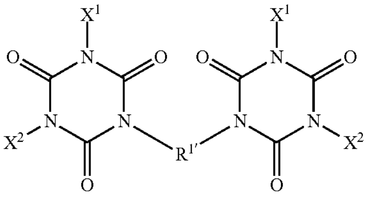

wherein:

$R^1$ is a monovalent organic group containing a polyether chain;

$R^{1'}$ is a divalent organic group containing a polyether chain;

the polyether chain is a chain represented by formula:

$$-(OC_5F_{12})_{m11}-(OCF_5F_{10})_{m12}-(OC_4F_8)_{m13}-(OC_3X^{10}{}_6)_{m14}-(OC_2F_4)_{m15}-(OCF_2)_{m16}-$$

wherein m11, m12, m13, m14, m15 and m16 are each independently 0 or an integer of 1 or more;

$X^{10}$ is independently H, F or Cl; and the occurrence order of the respective repeating units is not limited;

$X^1$ is independently a silane-containing reactive cross-linkable group; and $X^2$ independently represents a monovalent group.

$R^1$ is preferably a monovalent organic group containing a polyether chain (excluding those containing a urethane bond).

$R^{1'}$ is preferably a divalent organic group containing a polyether chain (excluding those containing a urethane bond).

$X^{10}$ is preferably F.

m11 to m16 are each preferably an integer of 0 to 200, and more preferably an integer of 0 to 100. The sum of m11 to m16 are preferably 1 or more, more preferably 5 or more, and further preferably 10 or more. The sum of m11 to m16 are preferably 200 or less, and more preferably 100 or less. The sum of m11 to m16 are preferably 10 to 200, and more preferably 10 to 100.

In the polyether chain, the respective repeating units may be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$ or the like, and is preferably $-(OCF_2CF_2CF_2CF_2CF_2CF_2)-$. For example, $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$ or the like, and is preferably $-(OCF_2CF_2CF_2CF_2CF_2)-$. For example, $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, and is preferably $-(OCF_2CF_2CF_2CF_2)-$. For example, $-(OC_3F_6)-$ may be any of $-(OCF_2CF_2CF_2)-$, $-(OCF(CF_3)CF_2)-$ and $-(OCF_2CF(CF_3))-$, and is preferably $-(OCF_2CF_2CF_2)-$. For example, $-(OC_2F_4)-$ may be any of $-(OCF_2CF_2)-$ and $-(OCF(CF_3))-$, and is preferably $-(OCF_2CF_2)-$.

In one embodiment, the polyether chain is a chain represented by $-(OC_3F_6)_{m14}-$ wherein m14 is an integer of 1 to 200. The polyether chain is preferably a chain represented by $-(OCF_2CF_2CF_2)_{m14}-$, wherein m14 is an integer of 1 to 200, or $-(OCF(CF_3)CF_2)_{m14}-$, wherein m14 is an integer of 1 to 200. In one embodiment, the polyether chain is a chain represented by $-(OCF_2CF_2CF_2)_{m14}-$, wherein m14 is an integer of 1 to 200. In another embodiment, the polyether chain is a chain represented by $-(OCF(CF_3)CF_2)_{m14}-$, wherein m14 is an integer of 1 to 200. m14 is preferably an integer of 5 to 200, and more preferably an integer of 10 to 200.

In another embodiment, the polyether chain is a chain represented by $-(OC_4F_8)_{m13}-(OC_3F_6)_{m14}-(OC_2F_4)_{m15}-(OCF_2)_{m16}-$, wherein m13 and m14 are each an integer of 0 to 30, and m15 and m16 are each an integer of 1 to 200, m13 to m16 are 5 or more in total, and the occurrence order of the respective repeating units is not limited. m15 and m16 are each preferably an integer of 5 to 200, and more preferably an integer of 10 to 200. m13 to m16 are preferably 10 or more in total. The polyether chain is preferably $-(OCF_2CF_2CF_2CF_2)_{m13}-(OCF_2CF_2CF_2)_{m14}-(OCF_2CF_2)_{m15}-(OCF_2)_{m16}-$. In one embodiment, the polyether chain is $-(OC_2F_4)_{m15}-(OCF_2)_{m16}-$, wherein m15 and m16 are each an integer of 1 to 200, and the occurrence order of the respective repeating units is not limited. m15 and m16 are each preferably an integer of 5 to 200, and more preferably an integer of 10 to 200.

In yet another embodiment, the polyether chain is a group represented by $-(R^{m1}-R^{m2})_{m17}-$. In the formula, $R^{m1}$ is $OCF_2$ or $OC_2F_4$, and preferably $OC_2F_4$. In the formula, $R^{m2}$ is a group selected from $OC_2F_4$, $OC_3F_6$, $OC_4F_8$, $OC_5F_{10}$ and $OC_6F_{12}$, or a combination of two or three groups independently selected from these groups. Preferably, $R^{m1}$ is a group selected from $OC_2F_4$, $OC_3F_6$ and $OC_4F_8$, a group selected from $OC_3F_6$, $OC_4F_8$, $OC_5F_{10}$ and $OC_6F_{12}$, or a combination of two or three groups independently selected from these groups. The combination of two or three groups independently selected from $OC_2F_4$, $OC_3F_6$ and $OC_4F_8$ is not limited, and examples thereof include $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. The m17 is an integer of 2 or more, preferably an integer of 3 or more, and more preferably an integer of 5 or more, and is an integer of 100 or less, and preferably an integer of 50 or less. In the formula, $OC_2F_4$, $OC_3F_6$, $OC_4F_8$, $OC_5F_{10}$ and $OC_6F_{12}$ may be each linear or branched, and are each preferably linear. In this embodiment, the polyether chain is preferably $-(OC_2F_4-OC_3F_6)_{m17}-$ or $-(OC_2F_4-OC_4F_8)_{m17}-$.

In yet another embodiment, the polyether chain is a group represented by $-(OC_6F_{12})_{m11}-(OC_5F_{10})_{m12}-(OC_4F_8)_{m13}-(OC_3F_6)_{m14}-(OC_2F_4)_{m15}-(OCF_2)_{m16}-$, wherein m15 is an integer of 1 or more and 200 or less, m11, m12, m13, m14, and m16 are each independently an integer of 0 or more and 200 or less, the sum of m11, m12, m13, m14, m15 and m16 is at least 1, and the occurrence order of the respective repeating units in parentheses with m11, m12, m13, m14, m15 or m16 is not limited in the formula. m15 is preferably an integer of 1 or more and 100 or less, and more preferably 5 or more and 100 or less. The sum of m11, m12, m13, m14, m15 and m16 is preferably 5 or more, more preferably 10 or more, for example, 10 or more and 100 or less.

In yet another embodiment, the polyether chain is a group represented by $-(OC_6F_{12})_{m11}-(OC_5F_{10})_{m12}-(OC_4F_8)_{m13}-(OC_3F_6)_{m14}-(OC_2F_4)_{m15}-(OCF_2)_{m16}-$, wherein m16 is an integer of 1 or more and 200 or less, m11, m12, m13, m14, and m15 are each independently an integer of 0 or more and 200 or less, the sum of m11, m12, m13, m14, m15 and m16 is at least 1, and the occurrence order of the respective repeating units in parentheses with m11, m12, m13, m14, m15 or m16 is not limited in the formula. m16 is preferably an integer of 1 or more and 100 or less, and more preferably 5 or more and 100 or less. The sum of m11, m12, m13, m14, m15 and m16 is preferably 5 or more, more preferably 10 or more, for example, 10 or more and 100 or less.

In the polyether chain, the ratio of m15 to m16 (hereinafter, referred to as "m15/m16 ratio") is 0.1 to 10, preferably 0.2 to 5, more preferably 0.2 to 2, further preferably 0.2 to 1.5, and still more preferably 0.2 to 0.85. An m15/m16 ratio of 10 or less further enhances lubricity, friction durability and chemical resistance (for example, durability to artificial sweat) of the surface-treating layer. A lower m15/m16 ratio further enhances lubricity and friction durability of the surface-treating layer. On the other hand, an m15/m16 ratio of 0.1 or more can further enhance stability of the compound. A higher m15/m16 ratio further enhances stability of the compound.

The polyether chain may be at least one chain selected from the group consisting of a chain represented by the following formula:

$$-(OCF_2CF_2CX^{11}_2)_{n11}(OCF_2CF(CF_3))_{n12}(OCF_2CF_2)_{n13}(OCF_2)_{n14}(OC_4F_8)_{n15}-$$

wherein n11, n12, n13, n14 and n15 are each independently 0 or an integer of 1 or more;

$X^{11}$ is independently H, F or Cl; and the occurrence order of the respective repeating units is not limited, and a chain represented by the following formula:

$$-(OCF_2-R^{11})_f-$$

wherein $R^{11}$ is a group selected from $OC_2F_4$, $OC_3F_6$, and $OC_4F_8$, and f is an integer of 2 to 100.

$X^{11}$ is preferably F.

n11 to n15 are each preferably an integer of 0 to 200. n11 to n15 are preferably 2 or more, more preferably 5 to 300, further preferably 10 to 200, and particularly preferably 10 to 100 in total.

$R^{11}$ is a group selected from $OC_2F_4$, $OC_3F_6$ and $OC_4F_8$, or a combination of two or three groups independently selected from these groups. The combination of two or three groups independently selected from $OC_2F_4$, $OC_3F_6$ and $OC_4F_8$ is not limited, and examples thereof include $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. f is an integer of 2 to 100, and preferably an integer of 2 to 50. In the formula, $OC_2F_4$, $OC_3F_6$ and $OC_4F_8$ may be each linear or branched, and are each preferably linear. In this embodiment, the formula: $-(OC_2F_4-R^{11})_f-$ is preferably the formula: $-(OC_2F_4-OC_3F_6)_f-$ or the formula: $-(OC_2F_4-OC_4F_8)_f-$.

The number average molecular weight of the polyether chain portion in the isocyanuric compound is not limited, and is, for example, 500 to 30,000, preferably 1,500 to 30,000, and more preferably 2,000 to 10,000. The number average molecular weight is defined as a value obtained by $^{19}F$-NMR measurement.

In another embodiment, the number average molecular weight of the polyether chain portion may be 500 to 30,000, preferably 1,000 to 20,000, more preferably 2,000 to 15,000, and still more preferably 2,000 to 10,000, for example, 3,000 to 6,000.

In another embodiment, the number average molecular weight of the polyether chain portion may be 4,000 to 30,000, preferably 5,000 to 10,000, and more preferably 6,000 to 10,000.

$R^1$ is preferably a monovalent organic group represented by the formula:

$$R^3-(OR^2)_a-L-$$

wherein $(OR^2)_a$ is the polyether chain described above;

$R^3$ is an alkyl group or a fluorinated alkyl group; and

L is a single bond or a divalent linking group.

$R^{1'}$ is preferably a monovalent organic group represented by the formula:

$$-L'-(OR^2)_a-L-$$

wherein $(OR^2)_a$ is the polyether chain;

L is independently a single bond or a divalent linking group;

L' is independently a single bond or a divalent linking group; and

L is bonded to the right isocyanuric ring of formula (I-2), and L' is bonded to the left isocyanuric ring.

The carbon number of $R^3$ is preferably 1 to 16, and preferably 1 to 8.

$R^3$ may be linear or branched, and is preferably a linear or branched alkyl group or a fluorinated alkyl group having 1 to 16 carbon atoms, more preferably a linear or branched chain alkyl group or a fluorinated alkyl group having 1 to 8 carbon atoms, and further preferably a linear or branched alkyl group or a fluorinated alkyl group having 1 to 6 carbon atoms, still more preferably a linear or branched alkyl group or a fluorinated alkyl group having 1 to 3 carbon atoms, and particularly preferably a linear alkyl group or a fluorinated alkyl group having 1 to 3 carbon atoms.

$R^3$ is preferably a fluorinated alkyl group having 1 to 16 carbon atoms, more preferably a $CF_2H-C_{1-15}$ fluoroalkylene group or a perfluoroalkyl group having 1 to 16 carbon atoms, and further preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, particularly 1 to 3 carbon atoms, and more preferably a linear perfluoroalkyl group having 1 to 3 carbon atoms; specifically, $-CF_3$, $-CF_2CF_3$ or $-CF_2CF_2CF_3$.

L is a single bond or a divalent linking group directly bonded to the isocyanuric ring of formula ($\alpha$1). L is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

L is further preferably a group represented by the formula:

$$—(CX^{121}X^{122})_o—(L^1)_p—(CX^{123}X^{124})_q—$$

wherein $X^{121}$ to $X^{124}$ are each independently H, F, OH, or $—OSi(OR^{125})_3$ wherein three $R^{125}$ are each independently an alkyl group having 1 to 4 carbon atoms;

$L^1$ is —C(═O) NH—, —NHC(═O)—, —O—, —C(═O)O—, —OC(═O)—, —OC(═O)O—, or —NHC(═O)NH—, in which the left side of each bond is bonded to $CX^{121}X^{122}$;

is an integer of 0 to 10;

p is 0 or 1; and q is an integer of 1 to 10.

L' is further preferably a group represented by the formula:

$$—(CX^{126}X^{127})_r—(CX^{121}X^{122})_o—(L^1)_p—(CX^{123}X^{124})_q—$$

wherein $X^{121}$ to $X^{124}$, $L^1$, o, p, and q have the same meanings as defined in L;

$X^{126}$ and $X^{127}$ are each independently H, F or Cl, and preferably F;

r is an integer of 1 to 6; and $—(CX^{126}X^{127})_r—$is bonded to $(OR^2)_a$ and $(CX^{123}X^{124})_q$ is bonded to the isocyanuric ring.

$L^1$ is preferably —O— or —C(═O)O—.

L is particularly preferably: a group represented by the formula:

$$—(CF_2)_{m11}—(CH_2)_{m12}—O—(CH_2)_{m13}—$$

wherein m11 is an integer of 1 to 3, m12 is an integer of 1 to 3, and m13 is an integer of 1 to 3;

a group represented by the formula:

$$—(CF_2)_{m14}—(CH_2)_{m15}—O—CH_2CH(OH)—(CH_2)_{m16}—$$

wherein m14 is an integer of 1 to 3, m15 is an integer of 1 to 3, and m16 is an integer of 1 to 3;

a group represented by the formula:

$$—(CF_2)_{m17}—(CH_2)_{m18}—$$

wherein m17 is an integer of 1 to 3 and m18 is an integer of 1 to 3; or a group represented by the formula:

$$—(CF_2)_{m19}—(CH_2)_{m20}—O—CH_2CH(OSi(OCH_3)_3)—(CH_2)_{m21}—$$

wherein m19 is an integer of 1 to 3, m20 is an integer of 1 to 3, and m21 is an integer of 1 to 3.

L is not limited, and specific examples thereof include $—C_2H_4—$, $—C_3H_6—$, $—C_4H_8—O—CH_2—$, $—CO—O—CH_2—CH(OH)—CH_2—$, $—(CF_2)_n—$, wherein n is an integer of 0 to 4, $—CH_2—$, $—C_4H_8—$, $—(CF_2)_n—(CH_2)_m—$, wherein n, m are each independently an integer of 0 to 4, $—CF_2CF_2CH_2OCH_2CH(OH)CH_2—$, and $—CF_2CF_2CH_2OCH_2CH(OSi(OCH_3)_3) CH_2—$.

$X^1$ is a monovalent silane-containing reactive crosslinkable group.

The silane-containing reactive crosslinkable group contributes to the adhesiveness with a base material. The crosslinkable group may chemically react with a material of the base material.

In one embodiment, the silane-containing reactive crosslinkable group is preferably a group represented by the formula:

$$—L^2—\{Si(R^a)_s(R^b)_t(R^c)_u(R^d)_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^d$ is the same or different and is —O—, —NH—, —C≡C—, or a silane bond;

s, t and u are the same or different and are each 0 or 1, v is an integer of 0 to 3, and n is an integer of 1 to 20; in a case where n is 1, s+t+u is 3 and v is 0; and in a case where n is 2 to 20, s+t+u is the same or different and is 0 to 2, and v is the same or different and is 0 to 2, and in a case where v is an integer of 1 or more, at least two Si atoms are bonded to each other via $R^d$ in a linear, ladder, cyclic, or polycyclic form.

$R^a$, $R^b$ and $R^c$ are monovalent groups bonded to a Si atom. $R^d$ is a divalent group bonded to two Si atoms.

$R^a$, $R^b$ and $R^c$ are the same or different and at least one of them is preferably hydrogen, halogen, an alkoxy group having 1 to 10 carbon atoms, or an amino group having 1 to 10 carbon atoms, and the others are each preferably an acetoxy group having 1 to 10 carbon atoms, an allyl group having 3 to 10 carbon atoms, or a glycidyl group having 3 to 10 carbon atoms, and further preferably an alkoxy group having 1 to 4 carbon atoms. In a case where n is 2 to 20, s+t+u is the same or different and is preferably 0 to 2, and v is preferably 0 to 2.

In $R^a$, $R^b$ and $R^c$, the halogen is preferably Cl, Br or I, and more preferably Cl.

In $R^a$, $R^b$ and $R^c$, the number of carbon atoms of the alkoxy group is preferably 1 to 5. The alkoxy group may be linear, cyclic or branched. Hydrogen atoms thereof are optionally substituted with a fluorine atom or the like. The alkoxy group is preferably a methoxy group, an ethoxy group, a propoxy group or a butoxy group, and more preferably a methoxy group or an ethoxy group.

$R^d$ is the same or different and is —O—, —NH—, —C≡C—, or a silane bond. $R^d$ is preferably —O—, —NH—, or —C≡C—. $R^d$ is a divalent group bonded to two Si atoms, and two or more silicon atoms may be bonded to each other via $R^d$ in a linear, ladder, cyclic, or polycyclic form. In a case where n is an integer of 2 or more, silicon atoms may be bonded to each other.

In one embodiment, $X^1$ is a silane-containing reactive crosslinkable group represented by the formula:

$$—L^2—\{Si(R^a)_s(R^b)_t(R^c)_u(R^{d'})_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^{d'}$ are the same or different, and is a group represented by —Z—$SiR^{d1'}_{p'}R^{d2'}_{q'}R^{d3'}_{r'}$, wherein Z is the same or different and is a single bond or a divalent linking group;

$R^{d1'}$ is the same or different and is $R^{d''}$;

$R^{d''}$ have the same meaning as $R^{d'}$;

the number of Si atoms linearly linked via a Z group in $R^{d'}$ is at most 5;

$R^{d2'}$ is the same or different and is a hydroxyl group or a hydrolyzable group;

$R^{d3'}$ is the same or different and is a hydrogen atom or a lower alkyl group;

p' is the same or different and is an integer of 0 to 3;

q' is the same or different and is an integer of 0 to 3; and r' is the same or different and is an integer of 0 to 3;

provided that the sum of p', q' and r' is 3;

s, t and u are the same or different and are each 0 or 1;

v is an integer of 0 to 3; and n is an integer of 1 to 20.

In the formula, Z is the same or different and represents a single bond or a divalent linking group.

Specific examples of Z include —$C_2H_4$—, —$C_3H_6$—, —CO—O—$CH_2$—CH(OH)—$CH_2$—, —$CH_2$—, and —$C_4H_8$—.

In the formula, $R^{d1}$ is the same or different and represents $R^{d''}$. $R^{d''}$ has the same meaning as $R^{d'}$.

The number of Si atoms linearly linked via a Z group in $R^{d'}$ is at most 5. That is, in the case where at least one $R^{d1'}$ is present in $R^{d'}$, two or more Si atoms linearly linked via a Z group are present in $R^{d'}$, and the number of such Si atoms linearly linked via a Z group is at most 5. Herein, "the number of Si atoms linearly linked via a Z group in $R^{d'}$ is equal to the number of repeating units —Z—Si—linearly linked in $R^{d'}$.

One example is represented below, where Si atoms are linked via a Z group in $R^{d'}$.

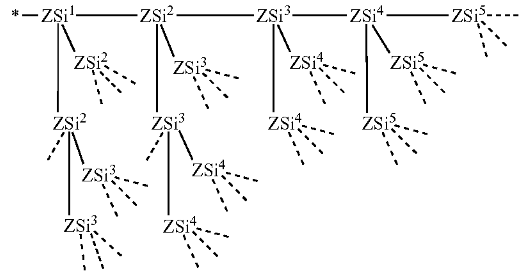

In the formula, "*" means a site bonded to Si in a main chain, and " . . . " means that a predetermined group other than ZSi is bonded, namely, " . . . " means a position at which repeating of ZSi is terminated in the case where all three bonds of a Si atom are " . . . ". The superscript number in Si means the number of occurrence of Si linearly linked via a Z group when counted from "*". That is, a chain where repeating of ZSi is terminated at $Si^2$ is a chain where the "number of Si atoms linearly linked via a Z group in $R^{d'}$" is 2, and similarly, respective chains where repeating of ZSi is terminated at $Si^3$, $Si^4$ and $Si^5$ mean respective chains where the "number of Si atoms linearly linked via a Z group in $R^{d'}$" is 3, 4 and 5. As clear from the formula, a plurality of ZSi chains are present in $R^{d'}$, and all the chains do not necessarily have the same length and, may each have any length.

In a preferable embodiment, the "number of Si atoms linearly linked via a Z group in $R^{d'}$" is 1 (left formula) or 2 (right formula) in all chains, as represented below.

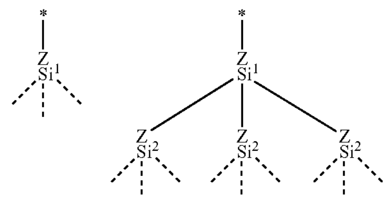

In one embodiment, the number of Si atoms linearly linked via a Z group in $R^{d'}$ is 1 or 2, preferably 1.

In the formula, $R^{d2'}$ is the same or different and represents a hydroxyl group or a hydrolyzable group. The hydroxyl group is not limited, and for example, may be generated by hydrolyzing the hydrolyzable group.

Preferably, $R^{d2'}$ is —OR, wherein R represents a substituted or unsubstituted $C_{1-3}$ alkyl group, and more preferably a methyl group.

In the formula, $R^{d3'}$ is the same or different and represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formula, p' is the same or different and is an integer of 0 to 3; q' is the same or different and is an integer of 0 to 3; and r' is the same or different and is an integer of 0 to 3, provided that the sum of p', q' and r' is 3.

In a preferable embodiment, q' in $R^{d'}$ ($R^d$ in the case where no $R^{d'}$ is present) at an end of $R^d$ is preferably 2 or more, for example, 2 or 3, more preferably 3.

In a preferable embodiment, $R^d$ may have at least one —Si(—Z—$SiR^{d2'}_{q'}R^{d3'}_{r'}$) 2 or —Si(—Z—$SiR^{d2'}_{q'}R^{d3'}_{r'}$)$_3$ at an end, preferably —Si(—Z—$SiR^{d2'}_{q'}R^{d3'}_{r'}$)$_3$. In such a formula, a (—Z—$SiR^{d2'}_{q'}R^{d3'}_{r'}$) unit is preferably (—Z—

$SiR^{d2'}_3$). In a further preferable embodiment, all ends of $R^d$ may be each preferably $—Si(—Z—SiR^{d2'}_{q'}R^{d3'}_{r'})_3$, more preferably $—Si(—Z—SiR^{d2'}_3)_3$. The adhesion to the base material increases as the number of $R^{d2'}$ bonded to each Si at the ends increases, and excellent durability can be obtained.

In a preferable embodiment, in the formulae, the number of Si atoms having a hydroxyl group or a hydrolyzable group may be preferably 1 to 6, more preferably 2 to 4, and further preferably 3 in formula (I-1), and may be preferably 2 to 12, more preferably 4 to 8, and further preferably 6 in formula (I-2).

In a preferable embodiment, v is 3 and each $R^d$ is independently $—Z—SiR^{d2'}_{q'}R^{d3'}_{r'}$.

$L^2$ is a single bond or a divalent linking group directly bonded to the ring of formula (I-1) or formula (I-2). $L^2$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^2$ include $—C_2H_4—$, $—C_3H_6—$, $—C_4H_8—O—CH_2—$, $—CO—O—CH_2—CH(OH)—CH_2—$, $—CH_2—$, and $—C_4H_8—$.

Examples of the silane-containing reactive crosslinkable group include $-L^2-SiR^5_3$, $-L^2-Si(OR^6)_3$, $-L^2-Si(NR^6_2)_3$, and $-L^2-Si(OCOR^6)_3$, wherein $L^2$ is as described above, $R^3$ is a halogen atom, and $R^6$ is independently an alkyl group having 1 to 4 carbon atoms.

In one embodiment, the silane-containing reactive crosslinkable group is preferably a group represented by the formula:

$$—L^6—\{C(R^{a6})_{s6}(R^{b6})_{t6}(R^{c6})_{u6}(R^{d6})_{v6}\}_{n6}$$

wherein $L^6$ is a single bond or a divalent linking group;

$R^{a6}$, $R^{b6}$ and $R^{c6}$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, a glycidyl group having 3 to 10 carbon atoms, $OCOR^{67}$, wherein $R^{67}$ is an alkyl group having 1 to 6 carbon atoms, OH or $—Y^6—SiR^{65}_{j6}R^{66}_{3-j6}$;

$R^{d6}$ is the same or different and is —O—, —NH—, —C≡C—, or $—Z^6—CR^{61}_{p6}R^{62}_{q6}R^{63}_{r6}$;

$Z^6$ is the same or different and is an oxygen atom or a divalent organic group;

In the formula, $R^{61}$ is the same or different and represents $R^{d6'}$;

$R^{d6'}$ has the same meaning as $R^{d6}$;

the number of C atoms linearly linked via a $Z^6$ group in $R^{d6}$ is at most 5;

$R^{62}$ is the same or different and is $—Y^6—SiR^{65}_{j6}R^{66}_{3-j6}$;

$Y^6$ is the same or different and is a divalent organic group;

$R^{65}$ is the same or different and is a hydroxyl group or a hydrolyzable group;

$R^{66}$ is the same or different and is a hydrogen atom or a lower alkyl group;

j6 with respect to each $(—Y^6—SiR^{65}_{j6}R^{66}_{3-j6})$ unit is independently an integer of 1 to 3;

$R^{63}$ is the same or different and is a hydrogen atom or a lower alkyl group;

p6 is the same or different and is an integer of 0 to 3;

q6 is the same or different and is an integer of 0 to 3;

r6 is the same or different and is an integer of 0 to 3; and s6, t6 and u6 are the same or different and are each 0 or 1, v6 is an integer of 0 to 3, and n6 is an integer of 1 to 20, provided that in the formula, at least two $—Y^6—SiR^{65}_{j6}R^{66}_{3-j6}$ are present.

$L^6$ is a single bond or a divalent linking group directly bonded to the ring of formula (I-1) or formula (I-2). $L^6$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^6$ include $—C_2H_4—$, $—C_3H_6—$, $—C_4H_8—O—CH_2—$, $—CO—O—CH_2—CH(OH)—CH_2—$, $—CH_2—$, and $—C_4H_8—$.

In $R^a$, $R^b$, $R^c$, $R^{a6}$, $R^{b6}$ and $R^{c6}$, the halogen is preferably Cl, Br or I, and more preferably $C_1$.

In $R^a$, $R^b$, $R^c$, $R^{a6}$, $R^{b6}$ and $R^{c6}$, the number of carbon atoms of the alkoxy group is preferably 1 to 5. The alkoxy group may be linear, cyclic or branched. Hydrogen atoms thereof are optionally substituted with a fluorine atom or the like. The alkoxy group is preferably a methoxy group, an ethoxy group, a propoxy group or a butoxy group, and more preferably a methoxy group or an ethoxy group.

$Z^6$ is preferably a $C_{1-6}$ alkylene group, $—(CH_2)_g—O—(CH_2)_h—$, wherein g is an integer of 0 to 6, for example, an integer of 1 to 6, and h is an integer of 0 to 6, for example, an integer of 1 to 6, or $-phenylene-(CH_2)_i—$, wherein i is an integer of 0 to 6, and more preferably a $C_{1-3}$ alkylene group. Such a group is optionally substituted with one or more substituents selected from, for example, a fluorine atom, a $C_{1-6}$ alkyl group, a $C_{2-6}$ alkenyl group, and a $C_{2-6}$ alkynyl group.

In the formulae, each $R^{61}$, at each occurrence, independently represents $R^{d6'}$. $R^{d6'}$ has the same meaning as $R^{d6}$.

The number of C atoms linearly linked via a $Z^6$ group in $R^{d6}$ is at most 5. That is, in the case where at least one $R^{61}$ is present in $R^{d6}$, two or more Si atoms linearly linked via a $Z^6$ group are present in $R^{d6}$, and the number of such C atoms linearly linked via a $Z^6$ group is at most 5. Herein, the "number of C atoms linearly linked via a $Z^6$ group in $R^{d6}$" is equal to the number of repeating units $—Z^6—C—$ linearly linked in $R^{d6}$.

In a preferable embodiment, the "number of C atoms linearly linked via a $Z^6$ group in $R^{d6}$" is 1 (left formula) or 2 (right formula) in all chains, as represented below.

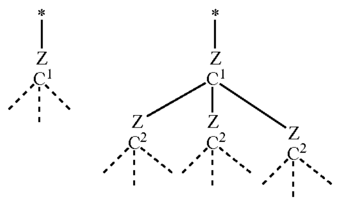

In one embodiment, the number of C atoms linearly linked via a $Z^6$ group in $R^{d6}$ is 1 or 2, preferably 1.

In the formula, $R^{62}$ represents $—Y^6—SiR^{65}_{j6}R^{66}_{3-j6}$.

Each $Y^6$, at each occurrence, independently represents a divalent organic group.

In a preferable embodiment, $Y^6$ is a $C_{1-6}$ alkylene group, $(CH_2)_{g'}—O—(CH_2)_{h'}—$, wherein g' is an integer of 0 to 6, for example, an integer of 1 to 6, and h' is an integer of 0 to 6, for example, an integer of 1 to 6, or -phenylene-$(CH_2)_{i'}—$, wherein i' is an integer of 0 to 6. Such a group is optionally substituted with one or more substituents selected from, for example, a fluorine atom, a $C_{1-6}$ alkyl group, a $C_{2-6}$ alkenyl group, and a $C_{2-6}$ alkynyl group.

In one embodiment, $Y^6$ may be a $C_{1-6}$ alkylene group or -phenylene-$(CH_2)_{i'}—$. In the case where Y is any of the groups as described above, light resistance, in particular, ultraviolet resistance can be more enhanced.

Each $R^{65}$, at each occurrence, independently represents a hydroxyl group or a hydrolyzable group. Examples of the "hydrolyzable group" are the same as those mentioned above.

Preferably, $R^{63}$ is —OR, wherein R represents a substituted or unsubstituted $C_{1-3}$ alkyl group, more preferably an ethyl group or a methyl group, in particular, a methyl group.

Each $R^{66}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

j6 with respect to a $(—Y—SiR^{65}_{j6}R^{66}_{3-j6})$ unit independently represents an integer of 1 to 3, preferably 2 or 3, more preferably 3.

Each $R^{63}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p6, at each occurrence, is independently an integer of 0 to 3; each q6, at each occurrence, is independently an integer of 0 to 3; and each r6, at each occurrence, is independently an integer of 0 to 3, provided that the sum of p6, q6 and r6 is 3.

In a preferable embodiment, q6 in $R^{d6'}$ ($R^{d6}$ itself in the case where no $R^{d6'}$ is present) at an end of $R^{d6}$ is preferably 2 or more, for example, 2 or 3, more preferably 3.

In one embodiment, $X^1$ is a group represented by the formula:

$$—L^2—\{Si(R^a)_s(R^b)_t(R^c)_u(R^d)_v\}_n,\quad \text{or}$$

$$—L^6—\{C(R^{a6})_{s6}(R^{b6})_{t6}(R^{c6})_{u6}(R^{d6})_{v6}\}_{n6}$$

wherein each symbol has the same meaning as described above.

In one embodiment, $X^2$ may be independently a monovalent organic group containing the polyether chain. Groups suitable for the organic groups are the same as for $R^1$.

In another embodiment, $X^2$ may be independently the silane-containing reactive crosslinkable group.

In another embodiment, $X^2$ may be independently at least one group selected from the group consisting of a silicone residue, a silsesquioxane residue and a silazane group.

Examples of the silicone residue include the following groups:

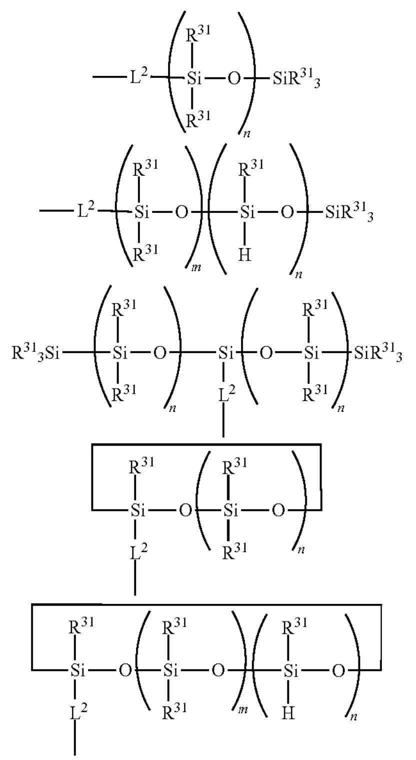

In each formula, $L^2$ is a single bond or a divalent linking group, n is an integer of 1 to 20, m is an integer of 0 to 10, each $R^{31}$ is independently a monovalent group, and at least one of $R^{31}$ contained in each group is a reactive group.

Each of the plurality of $R^{31}$ contained in each group is independently a monovalent group, and may be the reactive group or a group other than the reactive group, provided that at least one of the plurality of $R^{31}$ contained in each group is the reactive group.

The reactive group is preferably at least one selected from the group consisting of H, a halogen atom, $—OR^{32}$ where $R^{32}$ is an alkyl group having 1 to 4 carbon atoms or an aryl group having 6 to 20 carbon atoms, $-L^3-SiR^5_3$ where $L^3$ is a single bond or an alkylene group having 1 to 10 carbon atoms, and $R^5$ is a halogen atom, $-L^3-Si(OR^6)_3$ where $L^3$ is as described above, $R^6$ is independently an alkyl group having 1 to 4 carbon atoms, $-L^3-Si(NR^6_2)_3$ where $L^3$ and $R^6$ are as described above, $-L^3-Si(OCOR^6)_3$ where $L^3$ and $R^6$ are as described above, and a group containing any of these groups.

The group other than the reactive group is preferably at least one selected from the group consisting of an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, $—CONR^kCOR1$ where $R^k$ and $R^1$ are each independently H, an alkyl group or a halogenated alkyl group, a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula (I-1) or formula (I-2). Groups suitable for $L^2$ are as described above.

Examples of the silicone residue further include the following groups:

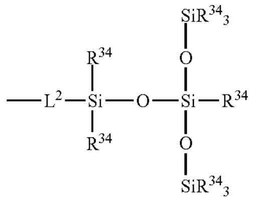

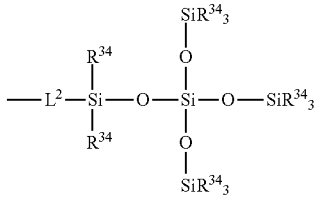

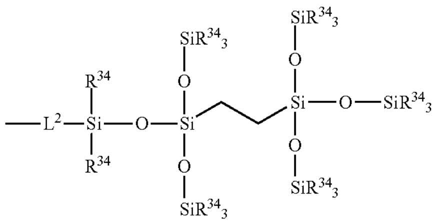

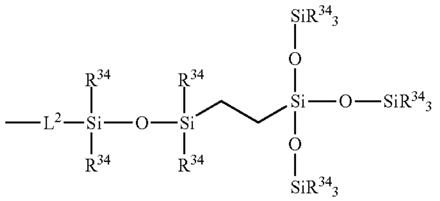

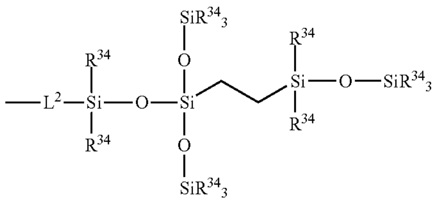

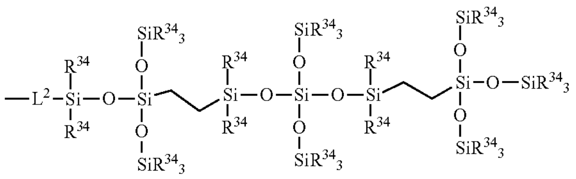

-continued

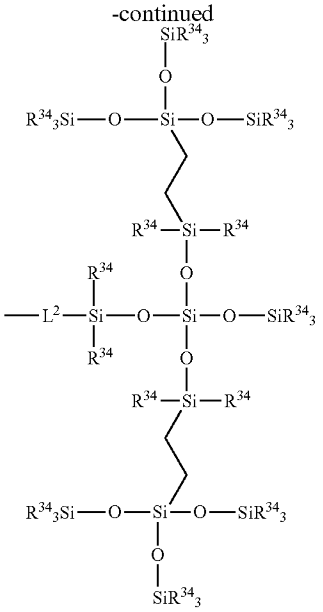

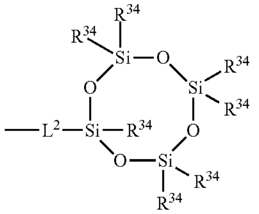

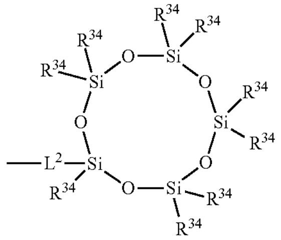

In each formula, $L^2$ is a single bond or a divalent linking group, $R^{34}$ is independently a monovalent group, and at least one of $R^{34}$ contained in each group is a reactive group.

Each of the plurality of $R^{34}$ contained in each group is independently a monovalent group, and may be the reactive group or a group other than the reactive group, provided that at least one of the plurality of $R^{34}$ contained in each group is the reactive group.

The reactive group is preferably at least one selected from the group consisting of —H, —$OR^{35}$ where $R^{35}$ is an alkyl group having 1 to 4 carbon atoms, a halogen atom, —OH, —O—$CR^{35}$=$CH_2$ where $R^{35}$ is as described above, —$OCOR^{35}$ where $R^{35}$ is as described above, —$OCOOR^i$ where Ri is an alkyl group or a halogenated alkyl group, —$NR^{35}_2$ where $R^{35}$ is as described above, and a group containing any of these groups.

The group other than the reactive group is preferably at least one selected from the group consisting of an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, —$CONR^kCOR^l$ where $R^k$ and $R^l$ are each independently H, an alkyl group or a halogenated alkyl group, a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula (I-1) or formula (I-2). Groups suitable for $L^2$ are as described above.

Examples of the silsesquioxane residue include the following groups:

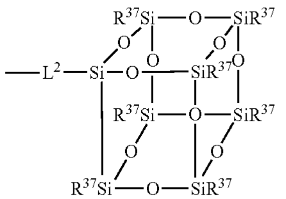

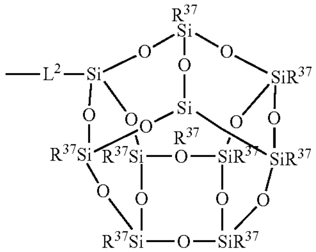

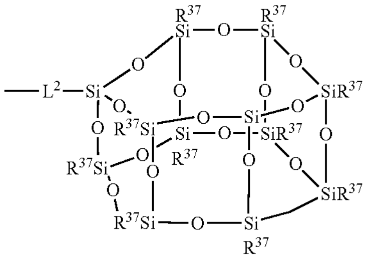

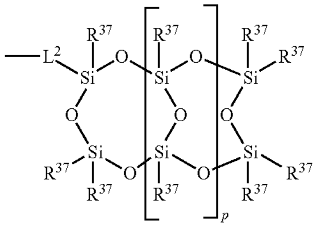

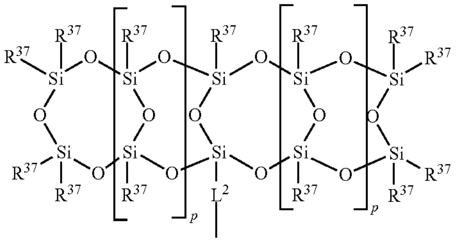

In each formula, $L^2$ is a single bond or a divalent linking group, $R^{37}$ is independently a monovalent group, at least one of $R^{37}$ contained in each group is a reactive group, and each p is independently an integer of 0 to 5000.

Each of the plurality of $R^{37}$ contained in each group is independently a monovalent group, and may be the reactive group or a group other than the reactive group, provided that at least one of the plurality of $R^{37}$ contained in each group is the reactive group.

The reactive group is preferably at least one selected from the group consisting of —H, —$OR^{35}$ where $R^{35}$ is an alkyl group having 1 to 4 carbon atoms, a halogen atom, —OH, —O—$CR^{35}$=$CH_2$ where $R^{35}$ is as described above, —$OCOR^{35}$ where $R^{35}$ is as described above, —$OCOOR^j$ where Ri is an alkyl group or a halogenated alkyl group, —$NR^{35}2$ where $R^{35}$ is as described above, and a group containing any of these groups.

The group other than the reactive group is preferably at least one selected from the group consisting of an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, —$CONR^kCOR^l$ where $R^k$ and $R^l$ are each independently H, an alkyl group or a halogenated alkyl group, a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula (I-1) or formula (I-2). Groups suitable for $L^2$ are as described above.

$X^2$ may be a group different from the monovalent organic group containing a polyether chain, the silane-containing reactive crosslinkable group, the silicone residue, the silsesquioxane residue and the silazane group described above.

That is, $X^2$ may be independently at least one selected from the group consisting of H, an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, —$OCOOR^j$ where $R^j$ is an alkyl group or a halogenated alkyl group, —$CONR^kCOR^l$ where $R^k$ and $R^l$ are each independently H, an alkyl group or a halogenated alkyl group, a group containing a sugar chain, an alkylene polyether group, an arene group, a halogenated arene group, a group containing a heterocycle, an aryl group, a halogenated aryl group, a silicone residue (excluding those having a reactive group), and a silsesquioxane residue (excluding those having a reactive group).

Examples of the silicone residue (excluding those having a reactive group) include the following groups, provided that the reactive group herein refers to any of the reactive groups exemplified as those that can constitute $R^{37}$:

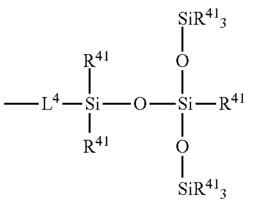

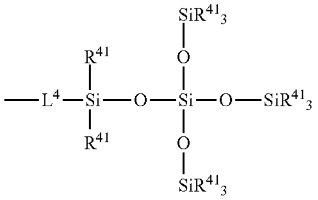

-continued

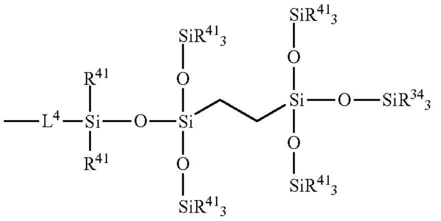

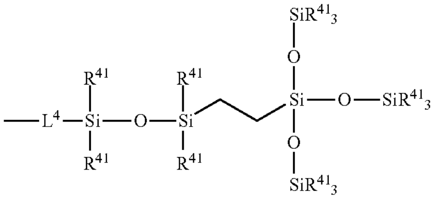

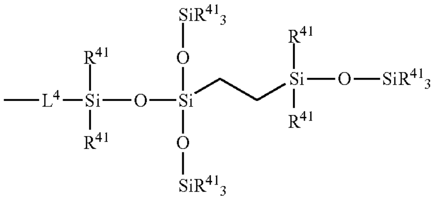

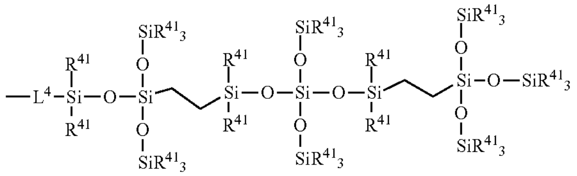

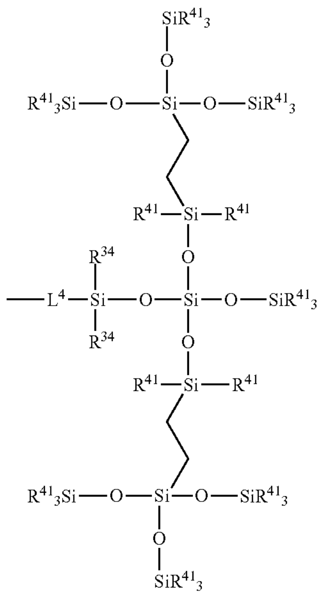

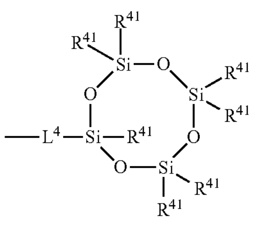

-continued

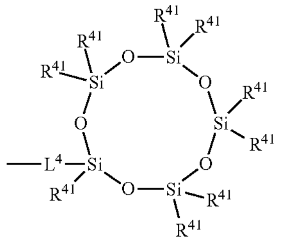

In each formula, $L^4$ is a single bond or a divalent linking group, and each $R^{41}$ is independently a monovalent group other than the reactive group.

The group other than the reactive group is preferably at least one selected from the group consisting of an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, $—CONR^kCOR^l$ where $R^k$ and $R^l$ are each independently H, an alkyl group or a halogenated alkyl group, a group containing a sugar chain, an alkylene polyether group, an arene group, a halogenated arene group, a group containing a heterocycle, an aryl group, and a halogenated aryl group.

$L^4$ is a single bond or a divalent linking group directly bonded to the ring of formula (I-1) or formula (I-2). $L^4$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^4$ include $—C_2H_4—$, $—C_3H_6—$, $—C_4H_8—O—CH_2—$, and $—CO—O—CH_2—CH(OH)—CH_2$.

Examples of the silsesquioxane residue (excluding those having a reactive group) include the following groups, provided that the reactive group herein refers to any of the reactive groups exemplified as those that can constitute $R^{37}$:

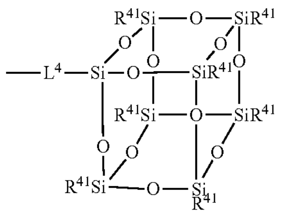

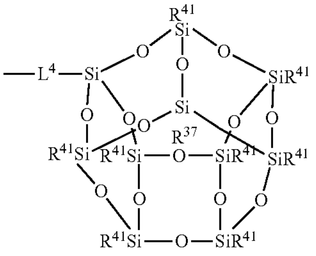

-continued

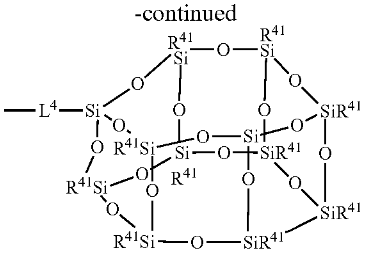

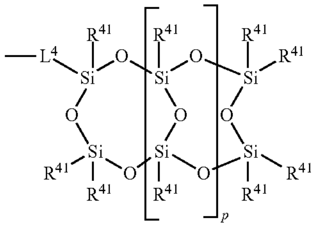

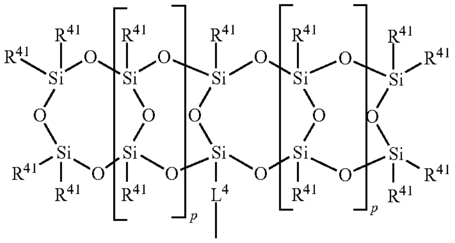

In each formula, $L^4$ is a single bond or a divalent linking group, each $R^{41}$ is independently a monovalent group other than the reactive group, and each p is an integer of 0 to 5000.

The group other than the reactive group is preferably at least one selected from the group consisting of an alkyl group, a halogenated alkyl group, an alkyl ester group, a halogenated alkyl ester group, an alkyl ether group, a halogenated alkyl ether group, an alkylamide group, a halogenated alkylamide group, an uril group, a halogenated uril group, a urea group, a halogenated urea group, $—CONR^kCOR^l$ where $R^k$ and $R^l$ are each independently H, an alkyl group or a halogenated alkyl group, a group containing a sugar chain, an alkylene polyether group, an arene group, a halogenated arene group, a group containing a heterocycle, an aryl group, and a halogenated aryl group.

$L^4$ is a single bond or a divalent linking group directly bonded to the ring of formula (I-1) or formula (I-2). Groups suitable for $L^4$ are as described above.

Examples of the silazane group include the following groups:

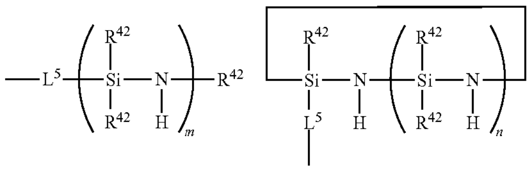

In each formula, $L^5$ is a single bond or a divalent linking group, m is an integer of 2 to 100, n is an integer of 100 or less, and each $R^{42}$ is independently H, an alkyl group having 1 to 10 carbon atoms, an alkenyl group, a cycloalkyl group having 5 to 12 carbon atoms, an aryl group having 6 to 10 carbon atoms, an alkylsilyl group, an alkylcyano group, or an alkoxy group having 1 to 4 carbon atoms.

$L^5$ is a single bond or a divalent linking group directly bonded to the ring of formula (I-1) or formula (I-2). $L^5$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^3$ include $—C_2H_4—$, $—C_3H_6—$, $—C_4H_8—O—CH_2—$, and $—COO—CH_2—CH(OH)—CH_2$.

Specific examples of the silazane group include the following groups:

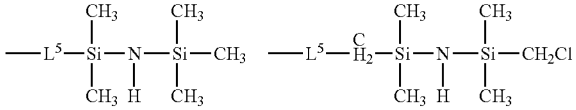

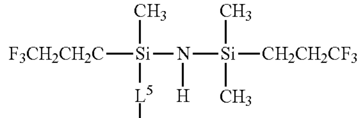

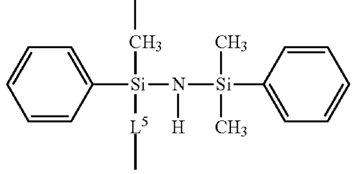

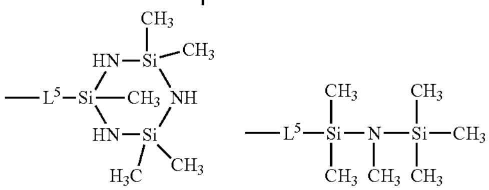

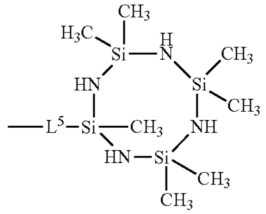

The number average molecular weight of $R^1$ in the compounds is not limited, and is 500 to 30,000, preferably 1,500 to 30,000, more preferably 2,000 to 10,000.

The compound may have an average molecular weight of $5\times10^2$ to $1\times10^5$, without any limitation. In particular, the compound preferably has an average molecular weight of 2,000 to 30,000, more preferably 2,500 to 12,000, from the viewpoint of UV resistance and friction durability. In the present disclosure, the "average molecular weight" refers to the number average molecular weight, and the "average molecular weight" is defined as a value obtained by $^{19}F$-NMR measurement.

In one embodiment, the compound α is a compound represented by formula (α1).

In another embodiment, the compound α may be a mixture of the compound represented by formula (I-1) and the compound represented by formula (I-2). In the mixture, the compound represented by formula (I-1) may be preferably 1 mol % or more, more preferably 10 mol % or more, further preferably 50 mol % or more, still more preferably 80 mol % or more, for example 90 mol % or more, 95 mol % or more or 99 mol % or more, and the upper limit thereof is not limited, and is less than 100 mol %, for example, 99 mol % or less, 95 mol % or less, 90 mol % or less, 85 mol % or less or 80 mol % or less, based on the compound represented by formula (I-1) and the compound represented by formula (I-2) in total.

In the surface-treating agent of the present disclosure, the compound α is 0.01% by mass to 99.9% by mass, preferably 0.1% by mass to 50% by mass, more preferably 0.1% by mass to 30% by mass, further preferably 0.1% by mass to 20% by mass, for example 1% by mass to 30% by mass or 5% by mass to 20% by mass. In the surface-treating agent of the present disclosure, the compound α may be 100 mol % (that is, including only the compound α), or may be 1 mol % to 99.9 mol %, preferably 10 mol % to 99 mol %, more preferably 30 mol % to 99 mol %, further preferably 50 mol % to 98 mol %, for example 60 mol % to 95 mol %, 70 mol % to 95 mol %, or 80 mol % to 95 mol % based on the component excluding the solvent (including the compound α).

The isocyanuric compound can be produced by the methods described in Patent Literature 1 and 2.

Perfluoropolyether group-containing silane compound having $OCF_2$ unit (hereinafter, also referred to as "compound II")

The compound β has a perfluoropolyether group having an $OCF_2$ unit and Si having a hydroxyl group or a hydrolyzable group, provided that the compound βexcludes compounds corresponding to the compound α.

In the compound β, the perfluoropolyether group has at least one $OCF_2$ unit, preferably 5 or more, and more preferably 10 or more.

In one embodiment, the perfluoropolyether group is a group represented by the formula:

$$-(OC_6F_{12})_{a1}-(OC_5F_{10})_{b1}-(OC_4F_8)_{c1}-(OC_3Rc_6)_{d1}-(OC_2F_4)_{e1}-(OCF_2)_{f1}-$$

wherein a1, b1, c1, d1 and e1 are each independently an integer of 0 or more and 200 or less, f1 is an integer of 1 or more and 200 or less, and the occurrence order of the respective repeating units in parenthesis with ai, b1, c1, d1, e1 or f1, is not limited in the formula.

In a preferable embodiment, ai, bi, c1, d1 and e1 are each independently an integer of 0 or more and 100 or less, and f1 is an integer of 1 or more and 200 or less. Preferably, the sum of ai, bi, c1, di, e1 and f1 is 5 or more, more preferably 10 or more, for example 10 or more and 100 or less.

The repeating unit in the perfluoropolyether group may be linear or branched, and is preferably linear. For example, $—(OC_6F_{12})—$ may be $—(OCF_2CF_2CF_2CF_2CF_2CF_2)—$, $—(OCF(CF_3)CF_2CF_2CF_2CF_2)—$, $—(OCF_2CF(CF_3)CF_2CF_2CF_2)—$, $—(OCF_2CF_2CF(CF_3)CF_2CF_2)—$, $—(OCF_2CF_2CF_2CF(CF_3)CF_2)—$, $—(OCF_2CF_2CF_2CF_2CF(CF_3))—$ or the like, and is preferably $—(OCF_2CF_2CF_2CF_2CF_2CF_2)—$. For example, $—(OC_5F_{10})—$ may be $—(OCF_2CF_2CF_2CF_2CF_2)—$, $—(OCF(CF_3)CF_2CF_2CF_2)—$, $—(OCF_2CF(CF_3)CF_2CF_2)—$, $—(OCF_2CF_2CF(CF_3)CF_2)—$, $—(OCF_2CF_2CF_2CF(CF_3))—$ or the like, and is preferably $—(OCF_2CF_2CF_2CF_2CF_2)—$. For example, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, and is preferably $—(OCF_2CF_2CF_2CF_2)—$. For example, $—(OC_3F_6)—$ may be any of $—(OCF_2CF_2CF_2)—$, $—(OCF(CF_3)CF_2)—$ and $—(OCF_2CF(CF_3))—$, and is preferably $—(OCF_2CF_2CF_2)—$. For example, $—(OC_2F_4)—$ may be any of $—(OCF_2CF_2)—$ and $—(OCF(CF_3))—$, and is preferably $—(OCF_2CF_2)—$.

In another embodiment, each perfluoropolyether group is independently$—(OC_4F_8)_{c2}—(OC_3F_6)_{d2}—(OC_2F_4)_{e2}—(OCF_2)_{f2}—$, wherein c2 and d2 are each independently an integer of 0 or more and 30 or less, e2 and f2 are each independently an integer of 1 or more and 200 or less, preferably 5 or more and 200 or less, more preferably 10 or more and 200 or less, and the occurrence order of the respective repeating units in parentheses with the subscript c2, d2, e2 or f2 is not limited in the formulae. Preferably, each perfluoropolyether group is independently $—(OCF_2CF_2CF_2CF_2)_{c2}—(OCF_2CF_2CF_2)_{d2}—(OCF_2CF_2)_{e2}—(OCF_2)_f—$. In one embodiment, each PFPE may be independently$—(OC_2F_4)_{e2}—(OCF_2)_{f2}—$, wherein e2 and f2 are each independently an integer of 1 or more and 200 or less, preferably 5 or more and 200 or less, more preferably 10 or more and 200 or less, and the occurrence order of the respective repeating units in parentheses with the subscript e2 or f2 is not limited in the formulae.

In yet another embodiment, each perfluoropolyether group is independently a group represented by $—(R^{106}—R^{107})_{q1}—$. In the formula, $R^{106}$ is $OCF_2$. In the formula, $R^{107}$ is a group selected from $OC_2F_4$, $OC_3F_6$, $OC_4F_8$, $OC_5F_{10}$ and $OC_6F_{12}$, or a combination of two or three groups independently selected from these groups. Preferably, $R^{107}$ is a group selected from $OC_2F_4$, $OC_3F_6$ and $OC_4F_8$, or a combination of two or three groups independently selected from these groups. The combination of two or three groups independently selected from $OC_2F_4$, $OC_3F_6$ and $OC_4F_8$ is not limited, and examples thereof include $—OC_2F_4OC_3F_6—$, $—OC_2F_4OC_4F_8—$, $—OC_3F_6OC_2F_4—$, $—OC_3F_6OC_3F_6—$, $—OC_3F_6OC_4F_8—$, $—OC_4F_8OC_4F_8—$, $—OC_4F_8OC_3F_6—$, $—OC_4F_8OC_2F_4—$, $—OC_2F_4OC_2F_4OC_3F_6—$, $—OC_2F_4OC_2F_4OC_4F_8—$, $—OC_2F_4OC_3F_6OC_2F_4—$, $—OC_2F_4OC_3F_6OC_3F_6—$, $—OC_2F_4OC_4F_8OC_2F_4—$, $—OC_3F_6OC_2F_4OC_2F_4—$, $—OC_3F_6OC_2F_4OC_3F_6—$, $—OC_3F_6OC_3F_6OC_2F_4—$, and $—OC_4F_8OC_2F_4OC_2F_4—$. ql is an integer of 2 to 100, and preferably an integer of 2 to 50. In the formula, $OC_2F_4$, $OC_3F_6$, $OC_4F_8$, $OC_5F_{10}$ and $OC_6F_{12}$ may be each linear or branched, and are each preferably linear. In this embodiment, preferably, each perfluoropolyether group is independently$—(OCF_2—OC_3F_6)_{q1}—$ or$—(OCF_2—OC_4F_8)_{q1}—$.

The "hydrolyzable group" in Si having a hydroxyl group or a hydrolyzable group means a group which can be removed from a main backbone of the compound by a hydrolysis reaction. Examples of the hydrolyzable group include —OR, —OCOR, —O—N=$CR_2$, —$NR_2$, —NHR, and halogen, wherein R represents a substituted or unsubstituted alkyl group having 1 to 4 carbon atoms, and —OR (namely, an alkoxy group) is preferable. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and for example, may be generated by hydrolyzing the hydrolyzable group.

In one embodiment, the compound (II) may be a compound represented by the following formula (A1), (A2), (B1), (B2), (C1), (C2), (D1), (D2), or (E1):

(A1)

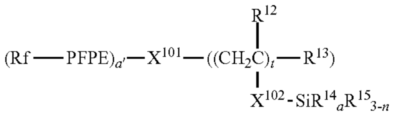

(A2)

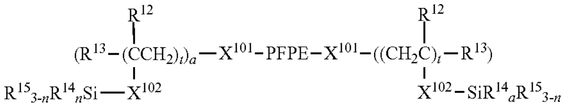

(B1)

$$(Rf—PFPE)_{\beta}—X^{105}—(SiR^{14}_{n}R^{15}_{3-n})_{\beta}$$

(B2)

$$(R^{15}_{3-n}R^{14}_{n}Si)_{\beta}—X^{105}—PFPE—X^{105}—(SiR^{14}_{n}R^{15}_{3-n})_{\beta}$$

(C1)

$$(Rf—PFPE)_{\gamma}—X^{107}—(SiR^{a3}_{k}R^{b3}_{l}R^{c3}_{m})_{\gamma}$$

(C2( $$(R^{c3}_{m}R^{b3}_{l}R^{a3}_{k}Si)_{\gamma}—X^{107}—PFPE—X^{107}—(SiR^{a3}_{k}R^{b3}_{l}R^{c3}_{m})_{\gamma}$$

(D1)

$$(Rf—PFPE)_{\delta}—X^{109}—(CR^{d3}_{k'}R^{e3}_{l'}R^{f3}_{m'})_{\delta}$$

(D2)

$$(R^{f3}_{m'}R^{e3}_{l'}R^{d3}_{k'}C)_{\delta}—X^{109}—PFPE—X^{109}—(CR^{d3}_{k'}R^{e3}_{l'}R^{f3}_{m'})_{\delta}$$

(E1)

$$(Rf—PFPE—G^{5})_{a5}—Z^{5}—((O—R^{16})_{c5}—SiR^{14}_{n}R^{15}_{3-n})_{b5}$$

In the above formulae, each Rf independently represents an alkyl group having 1 to 16 carbon atoms optionally substituted with one or more fluorine atoms.

The "alkyl group having 1 to 16 carbon atoms" in the alkyl group having 1 to 16 carbon atoms optionally substituted with one or more fluorine atoms may be linear or branched, and is preferably a linear or branched alkyl group having 1 to 6 carbon atoms, in particular, having 1 to 3 carbon atoms, more preferably a linear alkyl group having 1 to 3 carbon atoms.

Rf is preferably an alkyl group having 1 to 16 carbon atoms substituted with one or more fluorine atoms, more preferably a $CF_2H—C_{1-15}$ fluoroalkylene group or a perfluoroalkyl group having 1 to 16 carbon atoms, further preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, particularly 1 to 3 carbon atoms, and more preferably a linear perfluoroalkyl group having 1 to 3 carbon atoms; specifically, $—CF_3$, $—CF_2CF_3$ or $—CF_2CF_2CF_3$.

In the formula, PFPE represents a perfluoropolyether group. The perfluoropolyether group is as described above.

In the formulae, each $R^{14}$, at each occurrence, independently represents a hydrogen atom or an alkyl group having 1 to 22 carbon atoms, preferably an alkyl group having 1 to 4 carbon atoms.

In the formulae, each $R^{15}$, at each occurrence, independently represents a hydroxyl group or a hydrolyzable group.

The "hydrolyzable group", as used herein, means a group which can be removed from a main backbone of the compound by a hydrolysis reaction. Examples of the hydrolyzable group include —OR, —OCOR, —O—N═$CR_2$, —$NR_2$, —NHR, and halogen, wherein R represents a substituted or unsubstituted alkyl group having 1 to 4 carbon atoms, and —OR (namely, an alkoxy group) is preferable. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and for example, may be generated by hydrolyzing the hydrolyzable group.

In the formulae, each $R^{13}$, at each occurrence, independently represents a hydrogen atom or a halogen atom. The halogen atom is preferably an iodine atom, a chlorine atom or a fluorine atom, more preferably a fluorine atom.

In the formulae, each $R^{12}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, and examples thereof include a methyl group, an ethyl group and a propyl group.

In the formulae, n with respect to each $(—SiR^{14}_{n}R^{15}_{3-n})$ unit is independently an integer of 0 to 3, preferably 0 to 2, more preferably 0, provided that in the formulae, there is no case where all n(s) are simultaneously 0. In other words, at least one $R^{15}$ is present in the formulae.

In the formulae, each t is independently an integer of 1 to 10. In a preferable embodiment, t is an integer of 1 to 6. In another preferable embodiment, t is an integer of 2 to 10, preferably an integer of 2 to 6.

In the formulae, each $X^{102}$, at each occurrence, independently represents a single bond or a divalent organic group. $X^{102}$ is preferably an alkylene group having 1 to 20 carbon atoms, more preferably $—(CH_2)_u—$, wherein u is an integer of 0 to 2.

In the formulae, each $R^{a3}$, at each occurrence, independently represents $—Z^3—SiR^{71}_{p}R^{72}_{q}R^{73}_{r}$.

$Z^3$ is preferably a divalent organic group. In a preferable embodiment, $Z^3$ does not encompass any group which is taken together with a Si atom at an end of a molecular backbone in formula (C1) or formula (C2) (Si atom to which $R^{a3}$ is bonded) to form a siloxane bond.

$Z^3$ is preferably a $C_{1-6}$ alkylene group, $—(CH_2)_g—O—(CH_2)_h—$, wherein g is an integer of 1 to 6, and h is an integer of 1 to 6, or -phenylene-$(CH_2)_i$—, wherein i is an integer of 0 to 6, more preferably a $C_{1-3}$ alkylene group, particularly preferably a $C_{2-3}$ alkylene group, for example $—CH_2CH_2—$. Such a group is optionally substituted with one or more substituents selected from, for example, a fluorine atom, a $C_{1-6}$ alkyl group, a $C_{2-6}$ alkenyl group, and a $C_{2-6}$ alkynyl group.

In the formulae, each $R^{71}$, at each occurrence, independently represents $R^{a'}$. $R^{a'}$ has the same meaning as $R^{a3}$.

The number of Si atoms linearly linked via a $Z^3$ group is at most 5 in $R^{a3}$. That is, in the case where at least one $R^{71}$ is present in $R^{a3}$, two or more Si atoms linearly linked via a Z group are present in $R^{a3}$, and the number of such Si atoms linearly linked via a $Z^3$ group is at most 5. Herein, "the number of Si atoms linearly linked via a $Z^3$ group in $R^{a3}$" is equal to the number of repeating units $—Z^3—Si—$ linearly linked in $R^{a3}$.

In one embodiment, "the number of Si atoms linearly linked via a $Z^3$ group in $R^{a3}$" is 1 (left formula) or 2 (right formula), preferably 1. In other words, in the $—Si—R^{a3}$ portion containing Si atoms bonded to $X^{107}$ in formulae (C1)

and (C2), two Si atoms are linked in the left formula and three Si atoms are linked in the right formula.

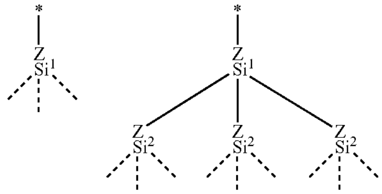

In a preferable embodiment, the "number of Si atoms linearly linked via a $Z^3$ group in $R^{a3}$" is 1 or 2, and preferably 1 in all chains.

In a preferable embodiment, k is 3 and the "number of Si atoms linearly linked via a $Z^3$ group in $R^{a3}$" is 1 in all chains.

In the formulae, each $R^{72}$, at each occurrence, independently represents a hydroxyl group or a hydrolyzable group.

Preferably, $R^{72}$ is —OR, wherein R represents a substituted or unsubstituted $C_{1-3}$ alkyl group, more preferably a methyl group.

In the formulae, each $R^{73}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p, at each occurrence, is independently an integer of 0 to 3; each q, at each occurrence, is independently an integer of 0 to 3; and each r, at each occurrence, is independently an integer of 0 to 3, provided that the sum of p, q and r is 3.

In a preferable embodiment, q in $R^{a3'}$ ($R^{a3}$ itself in the case where no $R^{a3'}$ is present) at an end of $R^{a3}$ is preferably 2 or more, for example, 2 or 3, more preferably 3.

In a preferable embodiment, $R^{a3}$ may have at least one of $—Si(—Z^3—SiR^{72}_qR^{73}_r)$ 2 or $—Si(—Z^3—SiR^{72}_qR^{73}_r)_3$, preferably $—Si(—Z^3—SiR^{72}_qR^{73}_r)_3$, at an end. In such a formula, a $(—Z^3—SiR^{72}_qR^{73}_r)$ unit is preferably $(—Z^3—SiR^{72}_3)$. In a further preferable embodiment, all ends of $R^a$ may be each $—Si(—Z^3—SiR^{72}_qR^{73}_r)_3$, preferably $—Si(—Z^3—SiR^{723})_3$.

In formulae (C1) and (C2), at least one $R^{72}$ is present.

In the formulae, each $R^{b3}$, at each occurrence, independently represents a hydroxyl group or a hydrolyzable group.

$R^{b3}$ preferably represents a hydroxyl group, —OR, —OCOR, —O—N═C(R)$_2$, —N(R)$_2$, —NHR, or halogen, wherein R represents a substituted or unsubstituted alkyl group having 1 to 4 carbon atoms, and each $R^{b3}$ is preferably —OR. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and for example, may be generated by hydrolyzing the hydrolyzable group. More preferably, $R^c$ is —OR, wherein R represents a substituted or unsubstituted $C_{1-3}$ alkyl group, more preferably a methyl group.

In the formulae, each $R^{c3}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each k, at each occurrence, independently represents an integer of 0 to 3; each l, at each occurrence, is independently an integer of 0 to 3; and each m, at each occurrence, is independently an integer of 0 to 3, provided that the sum of k, l and m is 3.

In the formulae, each $R^{d3}$, at each occurrence, independently represents $—Z^{3'}—CR^{81}_{p'}R^{82}_{q'}R^{83}_{r'}$.

In the formulae, each $Z^{3'}$, at each occurrence, independently represents an oxygen atom or a divalent organic group.

$Z^{3'}$ is preferably a $C_{1-6}$ alkylene group, $—(CH_2)_g—O—(CH_2)_h—$, wherein g is an integer of 0 to 6, for example an integer of 1 to 6, and h is an integer of 0 to 6, for example an integer of 1 to 6, or -phenylene-$(CH_2)_i$—, wherein i is an integer of 0 to 6, more preferably a $C_{1-3}$ alkylene group, further preferably a $C_{2-3}$ alkylene group, for example $CH_2CH_2$. Such a group is optionally substituted with one or more substituents selected from, for example, a fluorine atom, a $C_{1-6}$ alkyl group, a $C_{2-6}$ alkenyl group, and a $C_{2-6}$ alkynyl group.

In the formulae, each $R^{81}$, at each occurrence, independently represents $R^{d3''}$. $R^{d3''}$ has the same meaning as $R^{d3}$.

The number of C atoms linearly linked via a $Z^{3'}$ group in $R^{d3}$ is at most 5. That is, in the case where at least one $R^{81}$ is present in $R^{d3}$, two or more Si atoms linearly linked via a $Z^{3'}$ group are present in $R^{d3}$, and the number of such C atoms linearly linked via a $Z^{3'}$ group is at most 5. Herein, the "number of C atoms linearly linked via a Z3" group in $R^{d3''}$ is equal to the number of repeating units $—Z^{3'}—C$-linearly linked in $R^{d3}$.

In a preferable embodiment, the "number of C atoms linearly linked via a $Z^{3}$" group in $R^{d3''}$ is 1 (left formula) or 2 (right formula) in all chains, as represented below.

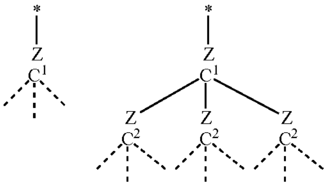

In one embodiment, the number of C atoms linearly linked via a $Z^{3'}$ group in $R^{d3}$ is 1 or 2, preferably 1.

In the formula, $R^{82}$ represents $—Y^3—SiR^{85}_3R^{86}_{3-j}$.

Each $Y^3$, at each occurrence, independently represents a divalent organic group.

In a preferable embodiment, $Y^3$ is a $C_{1-6}$ alkylene group, $—(CH_2)_{g'}—O(CH_2)_{h'}—$, wherein g' is an integer of 0 to 6, for example, an integer of 1 to 6, and h' is an integer of 0 to 6, for example, an integer of 1 to 6, or -phenylene-$(CH_2)_{i'}$—, wherein i' is an integer of 0 to 6. Such a group is optionally substituted with one or more substituents selected from, for example, a fluorine atom, a $C_{1-6}$ alkyl group, a $C_{2-6}$ alkenyl group, and a $C_{2-6}$ alkynyl group.

In one embodiment, $Y^3$ may be a $C_{1-6}$ alkylene group or -phenylene-$(CH_2)_{i'}$—. In the case where $Y^3$ is any of the groups, light resistance, in particular, ultraviolet resistance can be more enhanced.

Each $R^{85}$, at each occurrence, independently represents a hydroxyl group or a hydrolyzable group. Examples of the "hydrolyzable group" are the same as those mentioned above.

Preferably, $R^{83}$ is —OR, wherein R represents a substituted or unsubstituted $C_{1-3}$ alkyl group, more preferably an ethyl group or a methyl group, in particular, a methyl group.

Each $R^{86}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

j with respect to a ($—Y^3—SiR^{85}_jR^{86}_{3-j}$) unit independently represents an integer of 1 to 3, preferably 2 or 3, more preferably 3.

Each $R^{83}$, at each occurrence, independently represents a hydrogen atom, a hydroxyl group, or a lower alkyl group. Preferably, each $R^{83}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p', at each occurrence, is independently an integer of 0 to 3; each q', at each occurrence, is independently an integer of 0 to 3; and each r', at each occurrence, is independently an integer of 0 to 3, provided that the sum of p', q' and r' is 3.

In a preferable embodiment, q' in $R^{d3}$" ($R^{d3}$ itself in the case where no $R^{d3}$" is present) at an end of $R^{d3}$ is preferably 2 or more, for example, 2 or 3, more preferably 3.

In the formulae, each $R^{e3}$, at each occurrence, independently represents $—Y^3—SiR^{85}_jR^{86}_{3-j}$. Herein, $Y^3$, $R^{85}$, $R^{86}$ and j have the same meanings as in $R^{82}$ above.

In the formulae, each $R^{f3}$, at each occurrence, independently represents a hydrogen atom, a hydroxyl group or a lower alkyl group. Preferably, each $R^{f3}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each k', at each occurrence, is independently an integer of 0 to 3; each l', at each occurrence, is independently an integer of 0 to 3; and each m', at each occurrence, is independently an integer of 0 to 3, provided that the sum of k', l' and m' is 3.

In one embodiment, at least one k' is 2 or 3, preferably 3.

In one embodiment, k' is 2 or 3, preferably 3.

In one embodiment, l' is 2 or 3, preferably 3.

In formulae (D1) and (D2), at least one q' is 2 or 3, or at least one l' is 2 or 3. That is, in the formulae, at least two $—Y^3—SiR^{85}_jR^{86}_{3-j}$ groups are present in the formulae.

In the formulae, $G^5$ is $—R^{17}—O—$, $—R^{17}—CONH—$, —CONH—, or a single bond. $G^5$ is preferably $—R^{17}—CONH—$ or —CONH— from the viewpoint of excellent light resistance, and is preferably $—R^{17}—O—$, from the viewpoint of excellent chemical resistance.

$R^{17}$ is an alkylene group. $R^{17}$ is preferably an alkylene group having 1 to 4 carbon atoms, particularly preferably $—CH_2—$from the viewpoint of ease of production.

In the formulae, $Z^5$ is an (a5+b5)-valent hydrocarbon group or an (a5+b5)-valent group having 2 or more carbon atoms and having at least one etheric oxygen atom between carbon atoms in the hydrocarbon group. $Z^5$ is a residue obtained by removing hydroxyl groups from a polyhydric alcohol having (a5+b5) hydroxyl groups in the case where G5 is $—R^{17}—O—$ and c5 is 1.

In one embodiment, $Z^5$ may be the following groups:

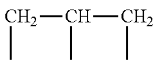

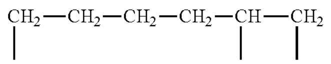

-continued

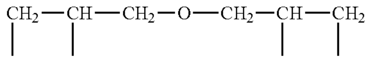

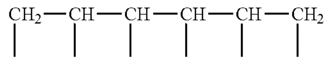

$Z^5$ is preferably a residue obtained by removing hydroxyl groups from a polyhydric alcohol having primary hydroxyl groups, from the viewpoint of excellent reactivity of the hydroxyl group. $Z^5$ is particularly preferably a group represented by the following formula (Z-1), a group represented by the following formula (Z-2), a group represented by the following formula (Z-3), a group represented by the following formula (Z-4) or a group represented by the following formula (Z-5) from the viewpoint of the availability of raw materials, provided that $R^4$ is an alkyl group, preferably a methyl group or an ethyl group.

(Z-1)

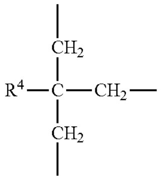

(Z-2)

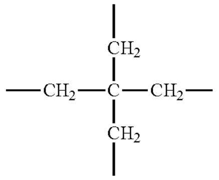

(Z-3)

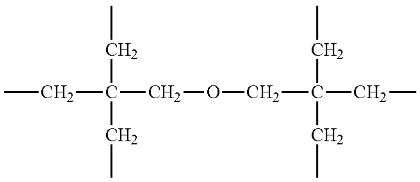

(Z-4)

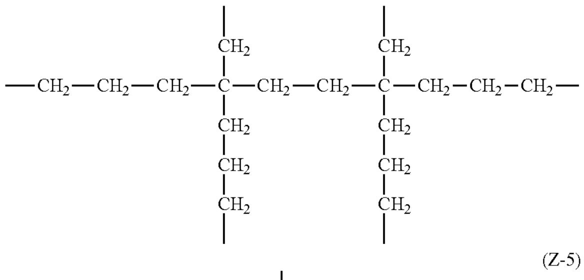

(Z-5)

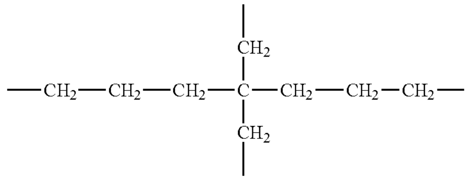

In the formulae, $R^{16}$ is an alkylene group. $R^{16}$ is preferably an alkylene group having 4 to 14 carbon atoms from the viewpoint of ease of production. Furthermore, particularly preferred is an alkylene group having 4 to 10 carbon atoms from the viewpoint that a by-product in which some or all of the allyl groups ($—CH_2CH═CH_2$) are isomerized to inner olefin ($—CH═CHCH_3$) is hardly produced in hydrosilylation in the production.

In the formulae, a5 is an integer of 1 or more. b5 is an integer of 1 or more. (a5+b5) is 3 or more. When a5 is 1, b5 is 4 or more, and when a5 is 2 or more, b5 is 1 or more. When a5 is 2 or more, a5 pieces of [Rf-PFPE-$G^5$] may be the same or different. When b5 is 2 or more, b(5) pieces of [$(O—R^{16})_{c5}—SiR^{14}{}_nR^{15}{}_{3-n}$] may be the same or different. c5 is 0 or 1.

a5 is preferably 1 to 10, particularly preferably 1 to 4. When a5 is the lower limit value or more, the water- and oil-repellency of the surface-treating layer, frictional durability, fingerprint stain removability and lubricity are excellent. When a5 is the upper limit value or less, the appearance of the surface-treating layer is excellent. (a5+b5) is preferably 3 to 15, particularly preferably 3 to 12.

When a5 is 1, b5 is 4 or more, preferably 4 to 10, particularly preferably 4 to 5. When a5 is 1 and b5 is not 4 or more, the frictional durability of the surface-treating layer may be insufficient. When b5 is the upper limit value or less, the appearance of the surface-treating layer and the stability of the compound are excellent.

When a5 is an integer of 2 or more, b5 is an integer of 1 or more, preferably an integer of 1 to 10, particularly preferably an integer of 1 to 4. When a5 is an integer of 2 or more, the lubricity of the surface-treating layer is excellent, and thus the friction force is not easily applied to the surface-treating layer. Therefore, even when b5 is 1, the frictional durability of the surface-treating layer is excellent. When b5 is the upper limit value or less, the appearance of the surface-treating layer and the stability of the compound are excellent.

c5 is 0 or 1. c5 is preferably 0 from the viewpoint of excellent light resistance of the compound, and is preferably 1 from the viewpoint of ease of production of the compound.

In the formulae, each $X^{101}$ independently represents a single bond or a di- to decavalent organic group. $X^{101}$ is understood to be a linker which links a perfluoropolyether portion (namely, Rf-PFPE portion or -PFPE- portion) mainly providing water-repellency, surface lubricity, and the like, and a silane portion (namely, group in parentheses with a) providing a binding ability to the base material, in any compound represented by formulae (A1) and (A2). Accordingly, $X^{101}$ may be a single bond or any organic group as long as such any compound represented by formulae (A1) and (A2) can be stably present.

In the formulae, $\alpha$ is an integer of 1 to 9, and $\alpha'$ is an integer of 1 to 9. Such $\alpha$ and $\alpha'$ may be varied depending on the valence of $X^{101}$. The sum of $\alpha$ and $\alpha'$ in formula (A1) is the same as the valence of $X^{101}$. For example, in the case where $X^{101}$ is a decavalent organic group, the sum of $\alpha$ and $\alpha'$ is 10, and for example, $\alpha$ may be 9 and $\alpha'$ may be 1, $\alpha$ may be 5 and $\alpha'$ may be 5, or $\alpha$ may be 1 and $\alpha'$ may be 9. In the case where $X^{101}$ is a single bond or a divalent organic group, $\alpha$ and $\alpha'$ are each 1. In formula (A2), $\alpha$ corresponds to a value obtained by subtracting 1 from the valence of $X^{101}$.

$X^{101}$ is preferably a di- to heptavalent, more preferably di- to tetravalent, further preferably divalent organic group.

In one embodiment, $X^{101}$ is a di- to tetravalent organic group, $\alpha$ is 1 to 3, and $\alpha'$ is 1.

In another embodiment, $X^{101}$ is a divalent organic group, $\alpha$ is 1, and $\alpha'$ is 1. In such a case, formulae (A1) and (A2) are represented by the following formulae (A1') and (A2'), respectively:

(A1')

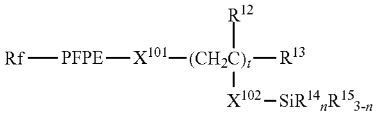

(A2')

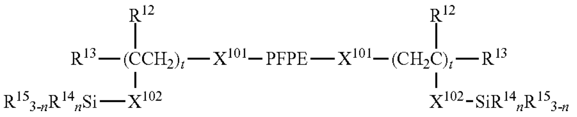

In the formulae, each $X^{105}$ independently represents a single bond or a di- to decavalent organic group. $X^{105}$ is understood to be a linker which links a perfluoropolyether portion (Rf-PFPE portion or -PFPE- portion) mainly providing water-repellency, surface lubricity, and the like, and a silane portion (specifically, $—SiR^{14}{}_nR^{15}{}_{3-n}$) providing a binding ability to the base material, in any compound represented by formulae (B1) and (B2). Accordingly, $X^{105}$ may be a single bond or any organic group as long as such any compound represented by formulae (B1) and (B2) can be stably present.

In the formulae, $\beta$ is an integer of 1 to 9 and $\beta'$ is an integer of 1 to 9. The integers represented by $\beta$ and $\beta'$ are determined in accordance with the valence of $X^{105}$, and in formula (B1), the sum of $\beta$ and $\beta'$ is the same as the valence of $X^{105}$. For example, in the case where $X^{105}$ is a decavalent organic group, the sum of $\beta$ and $\beta'$ is 10, and for example, $\beta$ may be 9 and $\beta'$ may be 1, $\beta$ may be 5 and $\beta'$ may be 5, or $\beta$ may be 1 and $\beta'$ may be 9. In the case where $X^{105}$ is a single bond or a divalent organic group, $\beta$ and $\beta'$ are each 1. In formula (B2), $\beta$ corresponds to a value obtained by subtracting 1 from the valence of $X^{105}$.

$X^{105}$ is preferably a di- to heptavalent, more preferably di- to tetravalent, further preferably divalent organic group.

In one embodiment, $X^{105}$ is a di- to tetravalent organic group, $\beta$ is 1 to 3, and $\beta'$ is 1.

In another embodiment, $X^{105}$ is a divalent organic group, $\beta$ is 1, and $\beta'$ is 1. In such a case, formulae (B1) and (B2) are represented by the following formulae (B1') and (B2'), respectively:

$$Rf—PFPE—X^{105}—SiR^{14}{}_nR^{15}{}_{3-n} \quad (B1')$$

$$R^{15}{}_{3-n}R^{14}{}_nSi—X^{105}—PFPE—X^{105}—SiR^{14}{}_nR^{15}{}_{3-n} \quad (B2')$$

In the formulae, each $X^{107}$ independently represents a single bond or a di- to decavalent organic group. $X^{107}$ is understood to be a linker which links a perfluoropolyether portion (Rf-PFPE portion or -PFPE- portion) mainly providing water-repellency, surface lubricity, and the like, and a silane portion (specifically, $—SiR^{a3}{}_kR^{b3}{}_lR^{c3}{}_m$ group) providing a binding ability to the base material, in any compound represented by formulae (C1) and (C2). Accordingly, $X^{107}$ may be a single bond or any organic group as long as such any compound represented by formulae (C1) and (C2) can be stably present.

In the formulae, $\gamma$ is an integer of 1 to 9 and $\gamma'$ is an integer of 1 to 9. The integers represented by $\gamma$ and $\gamma'$ are determined in accordance with the valence of $X^{107}$, and in formula (C1), the sum of $\gamma$ and $\gamma'$ is the same as the valence of $X^{107}$. For example, in the case where $X^{107}$ is a decavalent organic group, the sum of γ and γ' is 10, and for example, γ may be 9 and γ' may be 1, γ may be 5 and γ' may be 5, or γ may be 1 and γ' may be 9. In the case where $X^{107}$ is a single bond or a divalent organic group, γ and γ' are each 1. In formula (C2), γ corresponds to a value obtained by subtracting 1 from the valence of $X^{107}$.

$X^{107}$ is preferably a di- to heptavalent, more preferably di- to tetravalent, further preferably divalent organic group.

In one embodiment, $X^{107}$ is a di- to tetravalent organic group, γ is 1 to 3, and γ' is 1.

In another embodiment, $X^{107}$ is a divalent organic group, γ is 1, and γ' is 1. In such a case, formulae (C1) and (C2) are represented by the following formulae (C1') and (C2'), respectively.

$$Rf\text{—}PFPE\text{—}X^{107}\text{—}SiR^{a3}_{k}R^{b3}_{l}R^{c3}_{m} \tag{C1'}$$

$$R^{c3}_{m}R^{b3}_{l}R^{a3}_{k}Si\text{—}X^{107}\text{—}PFPE\text{—}X^{107}\text{—}SiR^{a3}_{k}R^{b3}_{l}R^{c3}_{m} \tag{C2'}$$

In the formulae, each $X^{109}$ independently represents a single bond or a di- to decavalent organic group. $X^{109}$ is understood to be a linker which links a perfluoropolyether portion (namely, Rf-PFPE portion or -PFPE- portion) mainly providing water-repellency, surface lubricity, and the like, and a portion (namely, group in parentheses with δ) providing a binding ability to the base material, in any compound represented by formulae (D1) and (D2). Accordingly, $X^{109}$ may be a single bond or any organic group as long as such any compound represented by formulae (D1) and (D2) can be stably present.

In the formulae, δ is an integer of 1 to 9 and δ' is an integer of 1 to 9. These δ and δ' may change depending on the valence of $X^{109}$. In formula (D1), the sum of δ and δ' is the same as the valence of $X^{109}$. For example, in the case where $X^{109}$ is a decavalent organic group, the sum of δ and δ' is 10, and for example, δ may be 9 and δ' may be 1, δ may be 5 and δ' may be 5, or δ may be 1 and δ' may be 9. In the case where $X^{109}$ is a single bond or a divalent organic group, δ and δ' are each 1. In formula (D2), δ corresponds to a value obtained by subtracting 1 from the valence of $X^{109}$.

$X^{109}$ is preferably a di- to heptavalent, more preferably di- to tetravalent, further preferably divalent organic group.

In one embodiment, $X^{109}$ is a di- to tetravalent organic group, δ is 1 to 3, and δ' is 1.

In another embodiment, $X^{109}$ is a divalent organic group, δ is 1, and δ' is 1. In such a case, formulae (D1) and (D2) are represented by the following formulae (D1') and (D2'), respectively.

$$Rf\text{—}PFPE\text{—}X^{109}\text{—}CR^{d3}_{k'}R^{e3}_{l'}R^{f3}_{m'} \tag{D1'}$$

$$R^{f3}_{m'}R^{e3}_{l'}R^{d3}_{k'}C\text{—}X^{109}\text{—}PFPE\text{—}X^{109}\text{—}CR^{d3}_{k'}R^{e3}_{l'}R^{f3}_{m'} \tag{D2'}$$

In a preferable embodiment, $X^{101}$, $X^{105}$, $X^{107}$, and $X^{109}$, may each independently be, but not limited to, a divalent group represented by the following formula:

$$\text{—}(R^{31})_{p1}\text{—}(X^{a})_{q1}\text{—}$$

wherein:

$R^{31}$ represents a single bond, —$(CH_2)_{s'}$— or o-, m- or p-phenylene group and preferably —$(CH_2)_{s'}$—, s' is an integer of 1 to 20, preferably an integer of 1 to 6, more preferably an integer of 1 to 3 and still more preferably 1 or 2, $X^a$ represents—$(X^b)_{l'}$—, each $X^b$, at each occurrence, independently represents a group selected from the group consisting of —O—, —S—, an o-, m- or p-phenylene group, —C(O)O—, —$Si(R^{33})_2$—, —$(Si(R^{33})_2O)_{m''}$—$Si(R^{33})_2$—, —$CONR^{34}$—, —O—$CONR^{34}$—, —$NR^{34}$— and —$(CH_2)_{n'}$—, each $R^{33}$, at each occurrence, independently represents a phenyl group, a $C_{1-6}$ alkyl group or a $C_{1-6}$ alkoxy group, preferably a phenyl group or a $C_{1-6}$ alkyl group, more preferably a methyl group, each $R^{34}$, at each occurrence, independently represents a hydrogen atom, a phenyl group or a $C_{1-6}$ alkyl group (preferably a methyl group), m'', at each occurrence, is independently an integer of 1 to 100, preferably an integer of 1 to 20, n', at each occurrence, is independently an integer of 1 to 20, preferably an integer of 1 to 6, more preferably an integer of 1 to 3, l' is an integer of 1 to 10, preferably an integer of 1 to 5, more preferably an integer of 1 to 3, p1 is 0 or 1, and q1 is 0 or 1, provided that at least one of p1 and q1 is 1, and the occurrence order of the respective repeating units in parentheses with p1 or q1 is not limited.

Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, $X^{101}$, $X^{105}$, $X^{107}$, and $X^{109}$ may be each independently a divalent group represented by:

$$\text{—}(R^{31})_{p1}\text{—}(X^{a})_{q1}\text{—}$$

wherein:

$R^{31}$ represents—$(CH_2)_{s'}$—, s' is an integer of 1 to 20, $X^a$ represents—$(X^b)_{l'}$—, each $X^b$, at each occurrence, independently represents a group selected from the group consisting of —O—, —$CONR^{34}$—, —O—$CONR^{34}$— and —$(CH_2)_{n'}$—, each $R^{34}$, at each occurrence, independently represents a hydrogen atom, a phenyl group or a $C_{1-6}$ alkyl group, each n', at each occurrence, is independently an integer of 1 to 20, l' is an integer of 1 to 10, p1 is 0 or 1, and q1 is 0 or 1, provided that at least one of p1 and q1 is 1, and the occurrence order of the respective repeating units in parentheses with p1 or q1 is not limited.

Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

Preferably, $X^{101}$, $X^{105}$, $X^{107}$, and $X^{109}$ are each independently—$(R^{31})_{p1}$—$(X^a)_{q1}$—$R^{32}$—. $R^{32}$ represents a single bond, —$(CH_2)_{t'}$— or an o-, m- or p-phenylene group, preferably —$(CH_2)_{t'}$—. Here, t' is an integer of 1 to 20, preferably an integer of 2 to 6, more preferably an integer of 2 to 3. Here, $R^{32}$ (typically, any hydrogen atom in $R^{32}$) is optionally substituted with one or more substituents selected from a fluorine atom, a $C_{1-3}$ alkyl group and a $C_{1-3}$ fluoroalkyl group.

Preferably, $X^{101}$, $X^{105}$, $X^{107}$, and $X^{109}$ may be each independently a single bond, $$—X^f—C_{1-20}\text{ alkylene group},\quad —X^f—R^{31}—X^c—R^{32}—,\quad\text{or}\quad —X^f—X^d—R^{32}—$$

wherein $R^{31}$ and $R^{32}$ have the same meaning as described above, and $X^f$ is a single bond or a perfluoroalkylene group having 1 to 6 carbon atoms, preferably 1 to 4 carbon atoms, more preferably 1 to 2 carbon atoms, for example, a difluoromethylene group.

More preferably, $X^{101}$, $X^{105}$, $X^{107}$, and $X^{109}$ may be each independently a single bond, $$—X^f—C_{1-20}\text{ alkylene group},\quad —X^f—(CH_2)_{s'}—X^c—,$$
$$—X^f—(CH_2)_{s'}—X^c—(CH_2)_{t'}—,\quad —X^f—X^d—,\quad\text{or}$$
$$—X^f—X^d—(CH_2)_{t'}—$$

wherein $X^f$, s' and t' have the same meaning as described above.

In the formulae, $X^c$ represents $$—O—,\quad —S—,\quad —C(O)O—,\quad —CONR^{34}—,$$
$$—O—CONR^{34}—,\quad —Si(R^{33})_2—,$$
$$—Si(R^{33})_2O)_{m''}—Si(R^{33})_2—,$$
$$—O—(CH_2)_{u'}—Si(R^{33})_2O)_{m''}—Si(R^{33})_2—,$$
$$—O—(CH_2)_{u'}—Si(R^{33})_2—O—Si(R^{33})_2—CH_2CH_2—Si(R^{33})_2—O—Si(R^{33})_2—,$$
$$—O—(CH_2)_{u'}—Si(OCH_3)_2OSi(OCH_3)_2—,$$
$$—CONR^{34}—(CH_2)_{u'}—(Si(R^{33})_2O)_{m''}—Si(R^{33})_2—,$$
$$—CONR^{34}—(CH_2)_{u'}—N(R^{34})—,\quad\text{or}$$
$$—CONR^{34}—(o—,\ m—\ \text{or}\ p—\text{phenylene})—Si(R^{33})_2—,$$

wherein $R^{33}$, $R^{34}$ and m' have the same meaning as described above, and u' is an integer of 1 to 20, preferably an integer of 2 to 6, more preferably an integer of 2 to 3. $X^c$ is preferably —O—.

In the formulae, $X^d$ represents $$—S—,\quad —C(O)O—,\quad —CONR^{34}—,$$
$$—O—CONR^{34}—,$$
$$—CONR^{34}—(CH_2)_{u'}—(Si(R^{33})_2O)_{m''}—Si(R^{33})_2—,$$
$$—CONR^{34}—(CH_2)_{u'}—N(R^{34})—,\ \text{or}$$
$$—CONR^{34}—(\text{o-, m- or p-phenylene})—Si(R^{33})_2—,$$

wherein each symbol has the same meaning as described above.

More preferably, $X^{101}$, $X^{105}$, $X^{107}$, and $X^{109}$ may be each independently a single bond, a $C_{1-20}$ alkylene group, $$—(CH_2)_{s'}—X^c—(CH_2)_{t'}—,\quad\text{or}\quad —X^d—(CH_2)_{t'}—,$$

wherein each symbol has the same meaning as described above.

In a preferable embodiment, the above $X^{101}$, $X^{105}$, $X^{107}$, and $X^{109}$ are each independently a single bond, a $C_{1-20}$ alkylene group, $$—(CH_2)_{s'}—X^c—,\quad\text{or}\quad —(CH_2)_{s'}—X^c—(CH_2)_{t'}—,$$

wherein $$X^c\text{ is }—O—,\quad —CONR^{34}—,\quad\text{or}\quad —O—CONR^{34}—,$$

each $R^{34}$, at each occurrence, independently represents a hydrogen atom, a phenyl group or a $C_{1-6}$ alkyl group, s' is an integer of 1 to 20, and t' is an integer of 1 to 20.

In one embodiment, $X^{101}$, $X^{105}$, $X^{10}$, and $X^{109}$ are each independently:

a single bond, a $C_{1-20}$ alkylene group, $$—(CH_2)_{s'}—O—(CH_2)_{t'}—,$$
$$—(CH_2)_{s'}—(Si(R^{33})_2O)_{m''}—Si(R^{33})_2—(CH_2)_{t'}—,$$
$$—(CH_2)_{s'}—O—(CH_2)_{u'}—(Si(R^{33})_2O)_{m''}—Si(R^{33})_2—(CH_2)_{t'}—,\quad\text{or}$$
$$—(CH_2)_{s'}—O—(CH_2)_{t'}—Si(R^{33})_2—(CH_2)_{u'}—Si(R^{33})_2—(C_vH_{2v})—$$

wherein $R^{33}$, m", s', t' and u' have the same meaning as described above, and v is an integer of 1 to 20, preferably an integer of 2 to 6, more preferably an integer of 2 to 3.

In the formula, $—(C_vH_{2v})—$ may be linear or branched, and may be, for example, $—CH_2CH_2—$, $—CH_2CH_2CH_2—$, $—CH(CH_3)—$, or $—CH(CH_3)\ CH_2—$.

The $X^{101}$, $X^{105}$, $X^{107}$, and $X^{109}$ groups are each independently and optionally substituted with one or more substituents selected from a fluorine atom, a $C_{1-3}$ alkyl group and a $C_{1-3}$ fluoroalkyl group (preferably, $C_{1-3}$ perfluoroalkyl group).

The left side of each formula of $X^{101}$, $X^{105}$, $X^{107}$, and $X^{109}$ is bonded to the PFPE group.

In the above formulae, $X^f$ is preferably a single bond for formulae (A1), (B1), (C1) and (D1), and a perfluoroalkylene group having 1 to 6 a carbon atoms, preferably 1 to 4 carbon atoms, and more preferably 1 to 2 carbon atoms, for example, a difluoromethylene group for formulae (A2), (B2), (C2) and (D2).

In one embodiment, the $X^{101}$, $X^{105}$, $X^{107}$, and $X^{109}$ groups may each be independently other than a $—O—C_{1-6}$ alkylene group.

In another embodiment, examples of the $X^{101}$, $X^{105}$, $X^{107}$, and $X^{109}$ groups include the following groups:

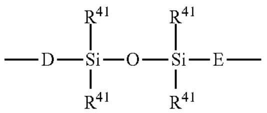

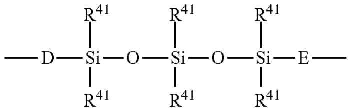

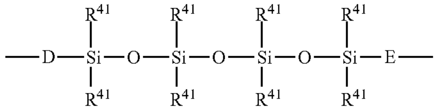

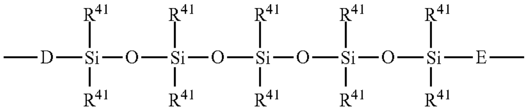

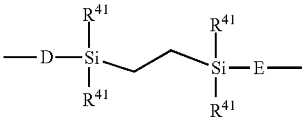

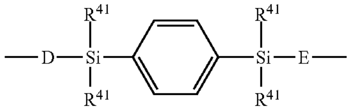

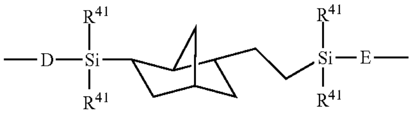

wherein each $R^{41}$ is independently a hydrogen atom, a phenyl group, an alkyl group having 1 to 6 carbon atoms, or a $C_{1-6}$ alkoxy group, preferably a methyl group;

D is a group selected from $—CH_2O(CH_2)_2—$, $—CH_2O(CH_2)_3—$, $—CF_2O(CH_2)_3—$, $—(CH_2)_2—$, $—(CH_2)_3—$, $—(CH_2)_4—$, $—CONH—(CH_2)_3—$, $—CON(CH_3)—(CH_2)_3—$, $—CON(Ph)-(CH_2)_3—$ wherein Ph means phenyl, and

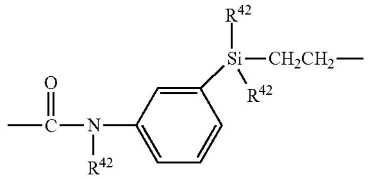

wherein each $R^{42}$ independently represents a hydrogen atom, a $C_{1-6}$ alkyl group or a $C_{1-6}$ alkoxy group, preferably a methyl group or a methoxy group, more preferably a methyl group, E is $—(CH_2)_n—$, wherein n is an integer of 2 to 6, and D is bonded to PFPE as a molecular backbone, and E is bonded to an opposite group to PFPE.

Specific examples of $X^{101}$, $X^{105}$, $X^{107}$, and $X^{109}$ include, for example:

a single bond, $—CH_2OCH_2—$, $—CH_2O(CH_2)_2—$, $—CH_2O(CH_2)_3—$, $—CH_2O(CH_2)_6—$, $—CF_2—CH_2—O—CH_2—$, $—CF_2—CH_2—O—(CH_2)_2—$, $—CF_2—CH_2—O—(CH_2)_3—$, $—CF_2—CH_2—O—(CH_2)_6—$, $—CH_2O(CH_2)_3Si(CH_3)_2OSi(CH_3)_2(CH_2)_2—$, $—CH_2O(CH_2)_3Si(CH_3)_2OSi(CH_3)_2OSi(CH_3)_2(CH_2)_2—$, $—CH_2O(CH_2)_3Si(CH_3)_2O(Si(CH_3)_2O)_2Si(CH_3)_2(CH_2)_2—$, $—CH_2O(CH_2)_3Si(CH_3)_2O(Si(CH_3)_2O)_3Si(CH_3)_2(CH_2)_2—$, $—CH_2O(CH_2)_3Si(CH_3)_2O(Si(CH_3)_2O)_{10}Si(CH_3)_2(CH_2)_2—$, $—CH_2O(CH_2)_3Si(CH_3)_2O(Si(CH_3)_2O)_{20}Si(CH_3)_2(CH_2)_2—$, $—CH_2OCF_2CHFOCF_2—$, $—CH_2OCF_2CHFOCF_2CF_2—$, $—CH_2OCF_2CHFOCF_2CF_2CF_2—$, $—CH_2OCH_2CF_2CF_2OCF_2—$, $—CH_2OCH_2CF_2CF_2OCF_2CF_2—$, $—CH_2OCH_2CF_2CF_2OCF_2CF_2CF_2—$, $—CH_2OCH_2CF_2CF_2OCF(CF_3)CF_2OCF_2—$, $—CH_2OCH_2CF_2CF_2OCF(CF_3)CF_2OCF_2CF_2—$, $—CH_2OCH_2CF_2CF_2OCF(CF_3)CF_2OCF_2CF_2CF_2—$, $—CH_2OCH_2CHFCF_2OCF_2—$, $—CH_2OCH_2CHFCF_2OCF_2CF_2—$, $—CH_2OCH_2CHFCF_2OCF_2CF_2CF_2—$, $—CH_2OCH_2CHFCF_2OCF(CF_3)CF_2OCF_2—$, $—CH_2OCH_2CHFCF_2OCF(CF_3)CF_2OCF_2CF_2—$, $—CH_2OCH_2CHFCF_2OCF(CF_3)CF_2OCF_2CF_2CF_2—$, $—CH_2OCF_2CHFOCF_2CF_2CF_2—C(O)NH—CH_2—$, $—CH_2OCH_2(CH_2)_7CH_2Si(OCH_3)_2OSi(OCH_3)_2(CH_2)_2Si(OCH_3)_2OSi(OCH_3)_2(CH_2)_2—$, $—CH_2OCH_2CH_2CH_2Si(OCH_3)_2OSi(OCH_3)_2(CH_2)_3—$, $—CH_2OCH_2CH_2CH_2Si(OCH_2CH_3)_2OSi(OCH_2CH_3)_2(CH_2)_3—$, $—CH_2OCH_2CH_2CH_2Si(OCH_3)_2OSi(OCH_3)_2(CH_2)_2—$, $—CH_2OCH_2CH_2CH_2Si(OCH_2CH_3)_2OSi(OCH_2CH_3)_2(CH_2)_2—$, $—(CH_2)_2—Si(CH_3)_2—(CH_2)_2—$, $—CH_2—$, $—(CH_2)_2—$, $—(CH_2)_3—$, $—(CH_2)_4—$, $—(CH_2)_5—$, $—(CH_2)_6—$, $—CF_2—CH_2—$, $—CF_2—(CH_2)_2—$, $—CF_2—(CH_2)_3—$, $—CF_2—(CH_2)_4—$, $—CF_2—(CH_2)_5—$, $—CF_2—(CH_2)_6—$, -continued $-CO-$, $-CONH-$, $-CONH-CH_2-$, $-CONH-(CH_2)_2-$, $-CONH-(CH_2)_3-$, $-CONH-(CH_2)_6-$, $-CF_2CONHCH_2-$, $-CF_2CONH(CH_2)_2-$, $-CF_2CONH(CH_2)_6-$, $-CON(CH_3)-(CH_2)_3-$, $-CON(Ph)-(CH_2)_3-$ wherein Ph means phenyl; $-CON(CH_3)-(CH_2)_6-$, $-CON(Ph)-(CH_2)_6-$ wherein Ph means phenyl;

$-CF_2-CON(CH_3)-(CH_2)_3-$, $-CF_2-CON(Ph)-(CH_2)_3-$ wherein Ph means phenyl; $-CF_2-CON(CH_3)-(CH_2)_6-$, $-CF_2-CON(Ph)-(CH_2)_6-$ wherein Ph means phenyl; $-CONH-(CH_2)_2NH(CH_2)_3-$, $-CONH-(CH_2)_6NH(CH_2)_3-$, $-CH_2O-CONH-(CH_2)_3-$, $-CH_2O-CONH-(CH_2)_6-$, $-S-(CH_2)_3-$, $-(CH_2)_2S(CH_2)_3-$, $-CONH-(CH_2)_3Si(CH_3)_2OSi(CH_3)_2(CH_2)_2-$, $-CONH-(CH_2)_3Si(CH_3)_2OSi(CH_3)_2OSi(CH_3)_2(CH_2)_2-$, $-CONH-(CH_2)_3Si(CH_3)_2O(Si(CH_3)_2O)_2Si(CH_3)_2(CH_2)_2-$, $-CONH-(CH_2)_3Si(CH_3)_2O(Si(CH_3)_2O)_3Si(CH_3)_2(CH_2)_2-$, $-CONH-(CH_2)_3Si(CH_3)_2O(Si(CH_3)_2O)_{10}Si(CH_3)_2(CH_2)_2-$, $-CONH-(CH_2)_3Si(CH_3)_2O(Si(CH_3)_2O)_{20}Si(CH_3)_2(CH_2)_2-$, $-C(O)O-(CH_2)_3-$, $-C(O)O-(CH_2)_6-$, $-CH_2-O-(CH_2)_3-Si(CH_3)_2-(CH_2)_2-Si(CH_3)_2-(CH_2)_2-$, $-CH_2-O-(CH_2)_3-Si(CH_3)_2-(CH_2)_2-Si(CH_3)_2-CH(CH_3)-$, $-CH_2-O-(CH_2)_3-Si(CH_3)_2-(CH_2)_2-Si(CH_3)_2-(CH_2)_3-$, $-CH_2-O-(CH_2)_3-Si(CH_3)_2-(CH_2)_2-Si(CH_3)_2-CH(CH_3)-CH_2-$, $-OCH_2-$, $-O(CH_2)_3-$, $-OCFHCF_2-$, and

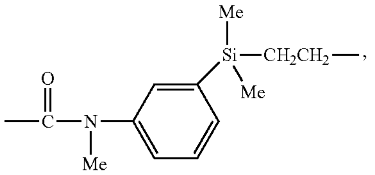

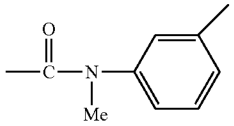

In yet another embodiment, $X^{101}$, $X^{105}$, $X^{107}$, and $X^{109}$ are each independently a group represented by the formula: $-(R^{18})_x-(CFR^{17})_y-(CH_2)_z-$. In the formula, x, y and z are each independently an integer of 0 to 10, the sum of x, y and z is 1 or more, and the occurrence order of the respective repeating units in parentheses is not limited in the formulae.

In the formulae, each $R^{18}$, at each occurrence, independently represents an oxygen atom, phenylene, carbazolylene, $-NR^{26}-$, wherein $R^{26}$ represents a hydrogen atom or an organic group, or a divalent organic group. Preferably, $R^{18}$ represents an oxygen atom or a divalent polar group.

The "divalent polar group" is not limited, and examples thereof include $-C(O)-$, $-C(=NR^{27})-$, and $-C(O)NR^{27}-$, wherein $R^{27}$ represents a hydrogen atom or a lower alkyl group. The "lower alkyl group" is, for example, an alkyl group having 1 to 6 carbon atoms, such as methyl, ethyl, or n-propyl, and such a group is optionally substituted with one or more fluorine atoms.

In the formulae, each $R^{17}$, at each occurrence, is independently a hydrogen atom, a fluorine atom or a lower fluoroalkyl group, preferably a fluorine atom. The "lower fluoroalkyl group" is, for example, a fluoroalkyl group having 1 to 6 carbon atoms, preferably having 1 to 3 carbon atoms, preferably a perfluoroalkyl group having 1 to 3 carbon atoms, more preferably a trifluoromethyl group or a pentafluoroethyl group, further preferably a trifluoromethyl group.

In yet another embodiment, examples of the $X^{101}$, $X^{105}$, $X^{107}$, and $X^{109}$ groups include the following groups:

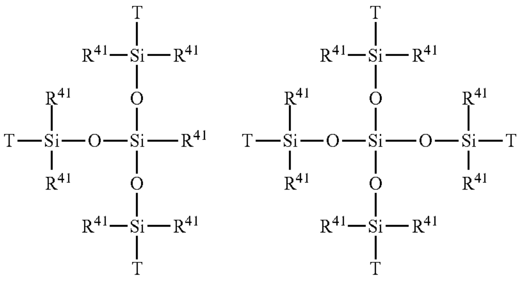

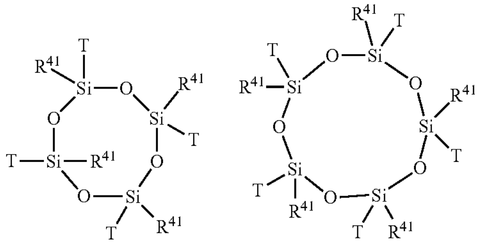

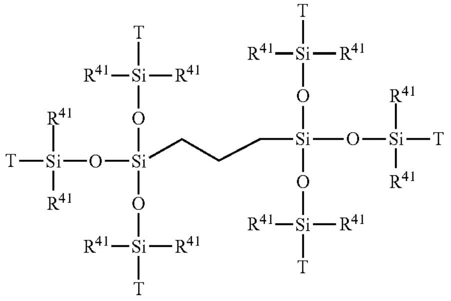

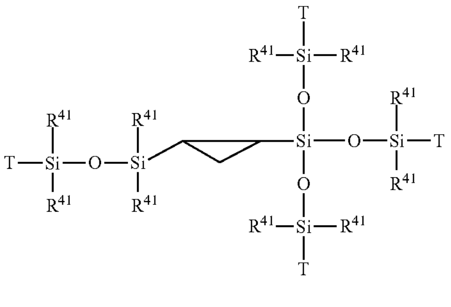

-continued

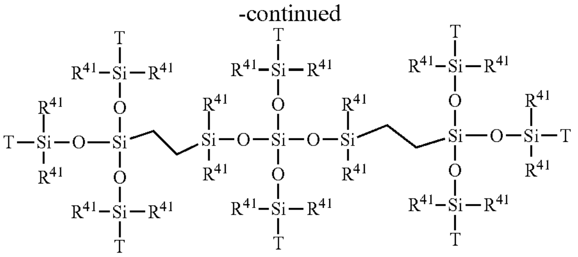

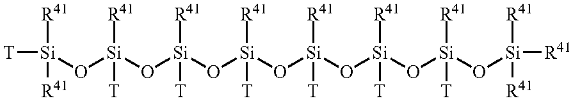

wherein each $R^{41}$ is independently a hydrogen atom, a phenyl group, an alkyl group having 1 to 6 carbon atoms, or a $C_{1-6}$ alkoxy group, preferably a methyl group; and any number of the Ts in each $X^{101}$ group is the following group bonded to PFPE as a molecular backbone:

$—CH_2O(CH_2)_2—$, $—CH_2O(CH_2)_3—$, $—CF_2O(CH_2)_3—$, $—(CH_2)_2—$, $—(CH_2)_3—$, $—(CH_2)_4—$, $—CONH—(CH_2)_3—$, $—CON(CH_3)—(CH_2)_3—$, $—CON(Ph)-(CH_2)_3—$wherein Ph means phenyl; or

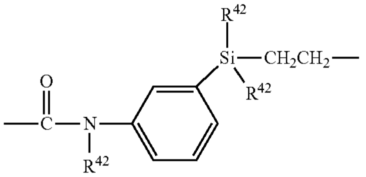

wherein each $R^{42}$ independently represents a hydrogen atom, a $C_{1-6}$ alkyl group or a $C_{1-6}$ alkoxy group, preferably a methyl group or a methoxy group, more preferably a methyl group, some other of the Ts is a carbon atom in groups opposite to PFPE as the molecular backbone (that is, in formula (A1), (A2), (D1) and (D2), and a Si atom in groups of the following formulae (B1), (B2), (C1) and (C2); and the remaining of the Ts, if present, is each independently a methyl group, a phenyl group, a $C_{1-6}$ alkoxy group, or a radical scavenging group or an UV absorbing group.

The radical scavenging group is not limited as long as it can scavenge a radical generated by light irradiation, and examples thereof include a residue of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet light, and examples thereof include a residue of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferable embodiment, examples of a preferable radical scavenging group or UV absorbing group include:

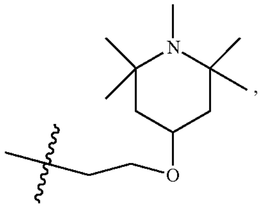

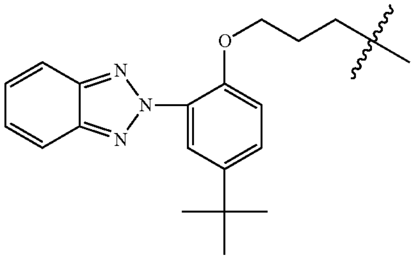

or

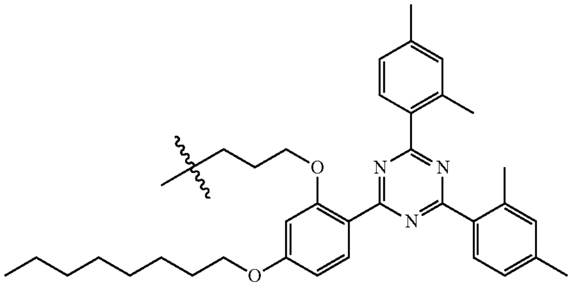

In this embodiment, $X^{101}$, $X^{105}$, $X^{107}$, and $X^{109}$ may each be independently a tri- to decavalent organic group.

In the surface-treating agent of the present disclosure, the compounds represented by formulae (A2), (B2), (C2) and (D2) are 0.1 mol % or more and 35 mol % or less, based on the compounds represented by formulae (A1), (B1), (C1), (D1) and (E1) (hereinafter, also referred to as component (1)") and the compounds represented by formulae (A2), (B2), (C2) and (D2) (hereinafter, also referred to as "component (2)") in total. The lower limit of the content of the compounds represented by formulae (A2), (B2), (C2), and (D2) with respect to the component (2) may be preferably 0.1 mol %, more preferably 0.2 mol %, further preferably 0.5 mol %, still more preferably 1 mol %, particularly preferably 2 mol %, especially 5 mol %. The upper limit of the content of the compounds represented by formulae (A2), (B2), (C2), and (D2) relative to the component (2) may be preferably 35 mol %, more preferably 30 mol %, further preferably 20 mol %, still more preferably 15 mol % or 10 mol %. The compounds represented by formulae (A2), (B2), (C2), and (D2) with respect to the component (2) are preferably 0.1 mol % or more and 30 mol % or less, more preferably 0.1 mol % or more and 20 mol % or less, further preferably 0.2 mol % or more and 10 mol % or less, still more preferably 0.5 mol % or more and 10 mol % or less, particularly preferably 1 mol % or more and 10 mol % or less, for example 2 mol % or more and 10 mol % or less, or 5 mol % or more and 10 mol % or less. The friction durability can be further improved by setting the component (2) in such a range.

The combination of the components (1) and (2) in the surface-treating agent is preferably a combination of the compound represented by formula (A1) and the compound represented by formula (A2), a combination of the compound represented by formula (B1) and the compound represented by formula (B2), a combination of the compound represented by formula (C1) and the compound represented by formula (C2), or a combination of the compound represented by formula (D1) and the compound represented by formula (D2).

In the compounds represented by formula (A1) and formula (A2), t is preferably 2 or more, more preferably an integer of 2 to 10, and further preferably an integer of 2 to 6. By setting t to 2 or more, a plurality of Si atoms having $R^{13}$ are present, and higher durability can be obtained.

In the compounds represented by formula (C1) and formula (C2), k is preferably 2 or 3, and more preferably 3.

In a preferable embodiment, the compounds represented by formula (C1) and formula (C2) have a $—Si—(Z—SiR^{72}_{3})_{2}$ or $—Si—(Z—SiR^{72}_{3})_{3}$ structure, and further preferably have a $—Si—(Z—SiR^{72}_{3})_{3}$ structure, at an end. The compound can have such a structure at the end, thereby allowing high durability to be obtained.

In the compounds represented by formula (D1) and formula (D2), l' is preferably 2 or 3, and more preferably 3.

In a preferable embodiment, the compounds represented by formula (D1) and formula (D2) have a $—C—(Y—SiR^{85}_{3})_{2}$ or $—Si—(Y—SiR^{85})_{3}$ structure, and further preferably has a $—Si—(Y—SiR^{85})_{3}$ structure, at an end. The compound can have such a structure at the end, thereby allowing high durability to be obtained.

In one embodiment, the compound (II) is a compound represented by formula (A1), (B1), (C1), (D1), or (E1).

In one embodiment, the compound (II) is a compound represented by formula (A2), (B2), (C2), or (D2).

In one embodiment, the compound (II) is a compound represented by formula (A1), (A2), (C1), (C2), (D1), (D2), or (E1). Since these compounds may have a plurality of Si atoms having a hydroxyl group or a hydrolyzable group at the end, higher friction durability can be obtained.

In one embodiment, the compound (II) is a compound represented by the above (C1), (C2), (D1), (D2), or (E1).

In one embodiment, the compound (II) is a compound represented by the above (C1), (C2), (D1), or (D2).

In one embodiment, the compound (II) is compounds represented by formulae (A1) and (A2).

In one embodiment, the compound (II) is compounds represented by formulae (B1) and (B2).

In one embodiment, the compound (II) is compounds represented by formulae (C1) and (C2). By using the compounds represented by formulae (C1) and (C2) as the compound (II), friction durability and surface lubricity are improved. Furthermore, the miscibility with a compound having an isocyanuric skeleton such as the compound (I) is improved.

In one embodiment, the compound (II) is a compound represented by formulae (D1) and (D2).

In one embodiment, the compound (II) is a compound represented by formula (E1).

Examples of preferred compound (E1) include compounds (1-1) to (1-8) of the following formulae. These compounds are preferable because they are easy to produce industrially, easy to handle, and provide excellent water- and oil-repellency, frictional resistance, fingerprint stain removability, lubricity, and appearance of the surface-treating layer.

(1-1)

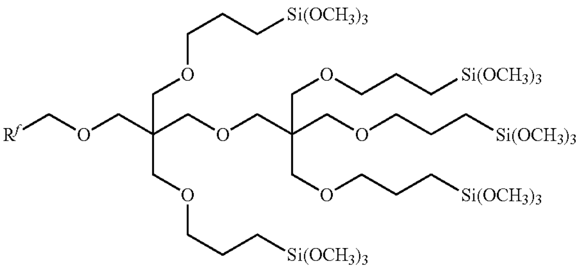

(1-2)

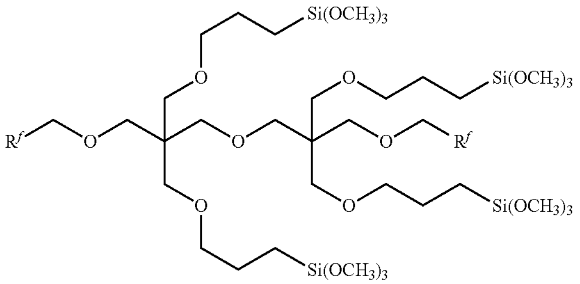

(1-3)

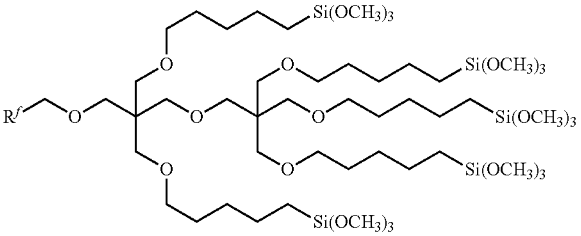

(1-4)

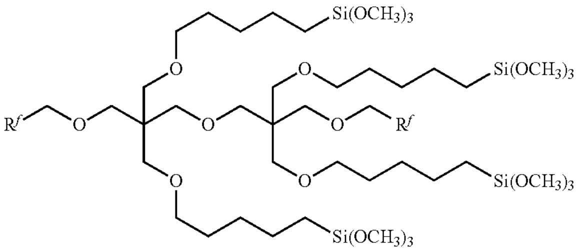

(1-5)

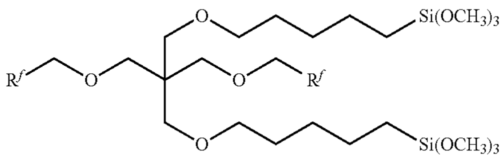

(1-6)

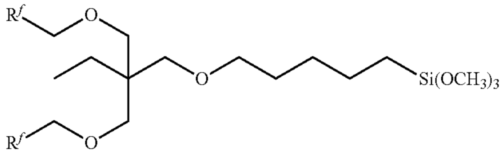

-continued (1-7)

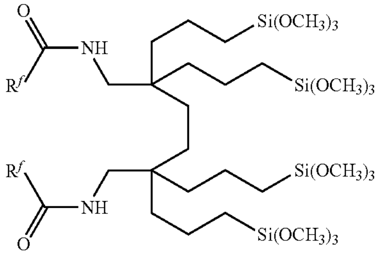

(1-8)

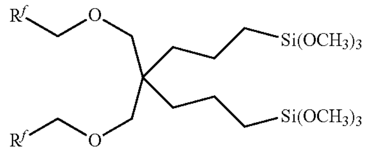

The number average molecular weight of the compound (II) used in the present disclosure is preferably 1,000 to 30,000, more preferably 1,500 to 30,000, further preferably 2,000 to 10,000.

In the surface-treating agent of the present disclosure, the weight ratio of the compound (I) to the compound (II) may be preferably 1:99 to 99:1, more preferably 5:95 to 90:10, further preferably 30:70 to 90:10, still more preferably 30:70 to 70:30. By setting the weight ratio of the compound (I) to the compound (II) within such a range, excellent UV durability and surface lubricity, abrasion durability such as eraser durability and steel wool durability can be achieved at the same time.

In one embodiment, the ratio of the number average molecular weight of the compound (I) and the number average molecular weight of the compound (II) may be preferably 9:1 to 1:9, more preferably 7:3 to 3:7, further preferably 6:4 to 4:6.

In one embodiment, the number average molecular weight of compound (I) is larger than the number average molecular weight of compound (II). In the case where the number average molecular weight of the compound (I) is larger than the number average molecular weight of the compound (II), preferably when the number average molecular weight ratio is in a relationship of 7:3 to 6:4 (compound (I):compound (II), the dynamic friction coefficient decreases, and thus the surface lubricity can be improved.

In another embodiment, the number average molecular weight of the compound (I) is less than or equal to the number average molecular weight of the compound (II). In the case where the number average molecular weight of the compound (I) is less than or equal to the number average molecular weight of the compound (II), preferably when the number average molecular weight ratio is 5:5 to 2:8 (compound (I):compound (II), not only can the dynamic friction coefficient be decreased to improve the surface lubricity, but also the abrasion resistance can be improved.

The compounds represented by formulae (A1), (A2), (B1), (B2), (C1), (C2), (D1), (D2), and (E1) can be produced by a method known in the art.

The surface-treating agent of the present disclosure may contain another silane compound in addition to the compound (I) and the compound (II).

Examples of the other silane compound include a compound represented by formula (I-1') and a compound represented by formula (I-2') in which the isocyanuric rings of the compound represented by formula (I-1) and the compound represented by formula (I-2) are opened, respectively:

(I-1')

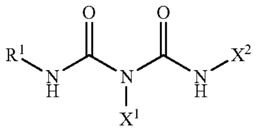

(I-2')

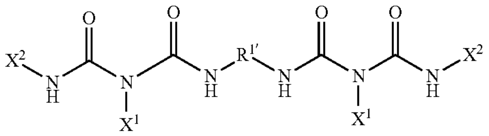

wherein each symbol has the same meaning as in formula (I-1) and formula (I-2); and silane compounds having the same structure as formulae (A1), (A2), (B1), (B2), (C1), (C2), (D1), (D2), and (E1), except that the perfluoropolyether group does not have an $OCF_2$ unit.

Examples of the perfluoropolyether group not having an $OCF_2$ unit include $$-(OC_6F_{12})_{m11}-(OC_5F_{10})_{m12}-(OC_4F_8)_{m13}-(OC_3X^{10}_6)_{m14}-(OC_2F_4)_{m15}-$$

wherein each symbol has the same meaning as the polyether chain.

The perfluoropolyether group not having an $OCF_2$ unit may also be a group represented by the following formula:

$$-(OC_3X^{10}_6)_{m14}-$$

wherein m14 and $X^{11}$ are the same meaning as described above, preferably $X^{11}$ is F, and a group represented by the following formula:

$$-(OC_2F_4-R^{11})_f-$$

wherein $R^{11}$ is a group selected from $OC_2F_4$, $OC_3F_6$, and $OC_4F_8$, and f is an integer of 2 to 100.

$-(OC_3X^{106})_{m14}-$ is preferably $-(OC_3F_6)_{m14}-$, more preferably $-(OCF(CF_3)CF_2)_{m14}-$ or $-(OCF_2CF_2CF_2)_{m14}-$, particularly preferably $-(OCF_2CF_2CF_2)_{m14}-$.

These other silane compounds may or may not be contained in the surface-treating agent, and in the case where they are contained, they may be preferably added 0.01 to 20 parts by mole, more preferably 0.1 to 15 parts by mole, for example, 1 to 10 parts by mole or 3 to 5 parts by mole, based on 100 parts by mole in total of the compound (I).

In addition to the compound (I) and the compound (II), the surface-treating agent of the present disclosure may contain compounds derived from the synthesis of the compound, for example, a compound represented by $R^1-OSO_2CF_3$ or $CF_3SO_2O-R^{1'}-OSO_2CF_3$.

The surface-treating agent of the present disclosure may contain a (unreactive) fluoropolyether compound which can be understood as a fluorine-containing oil, preferably a perfluoro (poly) ether compound (hereinafter, referred to as "fluorine-containing oil"). In the case where such a fluorine-containing oil is contained, the surface lubricity of the surface-treating layer formed by using the surface-treating agent can be further improved.

The fluorine-containing oil is not limited, and examples thereof include a compound (perfluoropolyether compound) represented by the following general formula (3):

$$Rf^1—(OC_4F_8)_{a'}—(OC_3F_6)_{b'}—(OC_2F_4)_{c'}—(OCF_2)_{d'}—Rf^2 \quad (3)$$

wherein $Rf^1$ represents a $C_{1-16}$ alkyl group optionally substituted with one or more fluorine atoms (preferably, $C_{1-16}$ is perfluoroalkyl group), $Rf^2$ represents a $C_{1-16}$ alkyl group optionally substituted with one or more fluorine atoms (preferably, $C_{1-16}$ perfluoroalkyl group), a fluorine atom or a hydrogen atom, and $Rf^1$ and $Rf^2$ are each independently, more preferably, a $C_{1-3}$ perfluoroalkyl group, a', b', c' and d' represent the respective four numbers of repeating units in perfluoropolyether constituting a main backbone of the polymer and are mutually independently an integer of 0 or more and 300 or less, the sum of a', b', c' and d' is at least 1, preferably 1 to 300, more preferably 20 to 300, the occurrence order of the respective repeating units in parentheses with the subscript a', b', c' or d' is not limited in the formula, and, among such repeating units, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, and is preferably $—(OCF_2CF_2CF_2CF_2)—$, $—(OC_3F_6)—$ may be any of $—(OCF_2CF_2CF_2)—$, $—(OCF(CF_3)CF_2)—$ and $—(OCF_2CF(CF_3))—$, and is preferably $—(OCF_2CF_2CF_2)—$, and $—(OC_2F_4)—$ may be any of $—(OCF_2CF_2)—$ and $—(OCF(CF_3))—$, and is preferably $—(OCF_2CF_2)—$.

Examples of the perfluoropolyether compound represented by general formula (3) include a compound represented by any of the following general formulae (3a) and (3b) (which may be adopted singly or as a mixture of two or more kinds thereof).

$$RF^1—(OCF_2CF_2CF_2)_{b''}—Rf^2 \quad (3a)$$

$$Rf^1-(OCF_2CF_2CF_2CF_2)_{a''}-(OCF_2CF_2CF_2)_{b''}-(OCF_2CF_2)_{c''}-(OCF_2)_{d''}-RF^2 \quad (3b)$$

In such formulae, $Rf^1$ and $Rf^2$ are as described above; in formula (3a), b" is an integer of 1 or more and 100 or less; and, in formula (3b), a" and b" are each independently an integer of 0 or more and 30 or less, for example, an integer of 1 or more and 30 or less, c" and d" are each independently an integer of 1 or more and 300 or less. The occurrence order of the respective repeating units in parentheses with the subscript a", b", c" or d" is not limited in the formula.

The fluorine-containing oil may have a number average molecular weight of 1,000 to 30,000. This allows high surface lubricity to be obtained.

The surface-treating agent in the present disclosure may or may not contain the fluorine-containing oil, and in the case of containing the fluorine-containing oil, may contain, for example, 0.1 to 500 parts by mass, preferably 1 to 400 parts by mass, and more preferably 5 to 300 parts by mass of such fluorine-containing oil based on 100 parts by mass in total of the perfluoropolyether group-containing compounds (in the case of two or more kinds, the total thereof, much the same is true on the following).

The compound represented by general formula (3a) and the compound represented by general formula (3b) may be used alone or in combination. It is preferable to use the compound represented by general formula (3b) rather than the compound represented by general formula (3a), as it provides higher surface lubricity. In the case where these are used in combination, the mass ratio of the compound represented by general formula (3a) and the compound represented by general formula (3b) is preferably 1:1 to 1:30, more preferably 1:1 to 1:10. With such a mass ratio, a surface-treating layer with an excellent balance between surface lubricity and frictional durability can be obtained.

In one embodiment, the fluorine-containing oil contains one or more of the compounds represented by general formula (3b). In such an embodiment, the mass ratio between the fluoro(poly)ether group-containing compounds in total and the compound represented by formula (3b) in the surface-treating agent is preferably 10:1 to 1:10, more preferably 4:1 to 1:4.

In one embodiment, the average molecular weight of the compound represented by formula (3a) is preferably 2,000 to 8,000.

In one embodiment, the average molecular weight of the compound represented by formula (3b) is preferably 8,000 to 30,000.

In another embodiment, the average molecular weight of the compound represented by formula (3b) is preferably 3,000 to 8,000.

In a preferable embodiment, in the case where the surface-treating layer is formed by the vacuum deposition method, the average molecular weight of the fluorine-containing oil may be larger than the average molecular weight of the compound (I) and the average molecular weight of the compound (II). The compound may have such a number average molecular weight, thereby allowing more excellent friction durability and surface lubricity to be obtained.

The fluorine-containing oil may be a compound represented by general formula $Rf^3—F$, wherein $Rf^3$ is a $C_{5-16}$ perfluoroalkyl group, from another viewpoint. It may also be a chlorotrifluoroethylene oligomer. The compound represented by $Rf^3—F$ and the chlorotrifluoroethylene oligomer are preferable in that high affinity with the fluorine-containing compound having a carbon-carbon unsaturated bond where an end thereof is a $C_{1-16}$ perfluoroalkyl group is obtained.

In the case where the surface-treating agent of the present disclosure contains a (unreactive) silicone compound that can be understood as (d) the silicone oil (hereinafter referred to as "silicone oil"), the surface lubricity of the surface-treating layer formed by using the surface-treating agent can be further improved.

For example, a linear or cyclic silicone oil having 2,000 or less siloxane bonds can be used as the silicone oil. The linear silicone oil may be so-called straight silicone oil and modified silicone oil. Examples of the straight silicone oil include dimethyl silicone oil, methylphenyl silicone oil and methylhydrogen silicone oil. Examples of the modified silicone oil include straight silicone oil modified with alkyl, aralkyl, polyether, higher fatty acid ester, fluoroalkyl, amino, epoxy, carboxyl, alcohol and the like. Examples of the cyclic silicone oil include cyclic dimethylsiloxane oil.

The surface-treating agent in the present disclosure may contain, for example, 0 to 300 parts by mass, preferably 0 to 200 parts by mass of such silicone oil based on 100 parts by mass in total of the compound (I) and the compound (II) (in the case of two or more kinds, the total thereof, much the same is true on the following).

The surface-treating agent of the present disclosure may include any catalyst, solvent, alcohol, transition metal, halide ion, compound containing an atom having an unshared electron pair in a molecular structure, or the like, as described above.

Examples of the catalyst include acids (for example, acetic acid and trifluoroacetic acid), bases (for example, ammonia, triethylamine, and diethylamine), and transition metals (for example, Ti, Ni, and Sn).

The catalyst promotes hydrolysis and dehydration condensation of the silane compound to accelerate formation of the coating layer.

Examples of the transition metal include platinum, ruthenium and rhodium.

Examples of the halide ion include chloride ion.

The compound containing an atom having an unshared electron pair in the molecular structure preferably contains at least one atom selected from the group consisting of a nitrogen atom, an oxygen atom, a phosphorus atom and a sulfur atom, more preferably a sulfur atom or a nitrogen atom.

The compound containing an atom having an unshared electron pair in the molecular structure preferably contains at least one functional group selected from the group consisting of an amino group, an amide group, a sulfinyl group, a P=O group, an S=O group and a sulfonyl group, and more preferably contains at least one functional group selected from the group consisting of a P=O group and an S=O groups, in the molecular structure.

The compound containing an atom having an unshared electron pair in the molecular structure is preferably at least one compound selected from the group consisting of an aliphatic amine compound, an aromatic amine compound, a phosphoric acid amide compound, an amide compound, a urea compound and a sulfoxide compound, more preferably at least one compound selected from the group consisting of an aliphatic amine compound, aromatic amines, phosphoric acid amide, an urea compound and a sulfoxide compounds, particularly preferably a sulfoxide compound, an aliphatic amine compound and an aromatic amine compound, further preferably a sulfoxide compound.

Examples of the aliphatic amine compound include diethylamine and triethylamine. Examples of the aromatic amine compound include aniline and pyridine. Examples of the phosphoric acid amide compound include hexamethylphosphoramide. Examples of the amide compound include N,N-diethylacetamide, N,N-diethylformamide, N,N-dimethylacetamide, N-methylformamide, N,N-dimethylformamide, and N-methylpyrrolidone. Examples of the urea compound include tetramethylurea. Examples of the sulfoxide compound include dimethyl sulfoxide (DMSO), tetramethylene sulfoxide, methylphenyl sulfoxide, and diphenyl sulfoxide. Among such compounds, dimethyl sulfoxide or tetramethylene sulfoxide is preferably used.

Examples of the alcohol include alcohol compounds having 1 to 6 carbon atoms.

Examples of the solvent include a $C_{5-12}$ perfluoroaliphatic hydrocarbon (for example, perfluorohexane, perfluoromethylcyclohexane and perfluoro-1,3-dimethylcyclohexane); a polyfluoroaromatic hydrocarbon (for example, bis(trifluoromethyl)benzene); a polyfluoroaliphatic hydrocarbon (for example, $C_6F_{13}CH_2CH_3$ (for example, ASAHI KLIN® AC-6000, manufactured by Asahi Glass Co., Ltd., and 1,1,2,2,3,3,4-heptafluorocyclopentane (for example, ZEORORA-H® manufactured by ZEON CORPORATION)); a hydrofluorocarbon (HFC) (for example, 1,1,1,3,3-pentafluorobutane (HFC-365mfc)); a hydrochlorofluorocarbon (for example, HCFC-225 (ASAHI KLIN® AK225)); and a hydrofluoroether (HFE) (for example, an alkyl perfluoroalkylether (a perfluoroalkyl group and an alkyl group may be linear or branched) such as perfluoropropyl methyl ether ($C_3F_7OCH_3$) (for example, Novec (trade name) 7000, manufactured by SUMITOMO 3M), perfluorobutyl methyl ether ($C_4F_9OCH_3$) (for example, Novec (trade name) 7100, manufactured by SUMITOMO 3M), perfluorobutyl ethyl ether ($C_4F_9OC_2H_5$) (for example, Novec (trade name) 7200, manufactured by SUMITOMO 3M), perfluorohexyl methyl ether ($C_2F_5CF(OCH_3)C_3F_7$) (for example, Novec (trade name) 7300 manufactured by SUMITOMO 3M) or $CF_3CH_2OCF_2CHF_2$ (for example, ASAHI KLIN® AE-3000, manufactured by Asahi Glass Co., Ltd.), 1,2-dichloro-1,3,3,3-tetrafluoro-1-propene (for example, Vertrel® Sion, manufactured by Du Pont-Mitsui Fluorochemicals Co., Ltd.). Such a solvent may be used singly or as a mixture prepared by mixing two or more solvents in combination. To control, e.g., solubility of the perfluoropolyether group-containing silane compound, another solvent may be mixed.

In addition to the above, examples of other components include tetraethoxysilane, methyltrimethoxysilane, 3-aminopropyltrimethoxysilane, 3-glycidoxypropyltrimethoxysilane, and methyltriacetoxysilane.

In the surface-treating agent of the present disclosure, the total concentration of the compound (I) and the compound (II) is preferably 0.001 to 1% by mass, more preferably 0.005 to 0.5% by mass, further preferably from 0.01 to 0.2% by mass.

The surface-treating agent of the present disclosure can be formed into a pellet by impregnating a porous material, for example, a porous ceramic material or a metal fiber for example that obtained by solidifying a steel wool, therewith. The pellet may be used for vacuum deposition, for example.

The present disclosure also provides an article having a surface-treating layer formed by the surface-treating agent of the present disclosure.

The article of the present disclosure comprises: a base material; and a layer disposed on a surface of the base material, the layer being formed by the above-described surface-treating agent (a surface-treating layer, for example, a stain-proof coating layer).

The base material may be any suitable material such as glass, a resin (which may be a natural or synthetic resin, for example, a common plastic material, and may be in the form of a plate, a film, or the like), a metal (which may be a single substance of a metal such as aluminum, copper, iron, zinc, titanium or zirconium, or a composite such as an alloy thereof), ceramics, a semiconductor (silicon, germanium, or the like), a fiber (woven cloth, unwoven cloth, or the like), fur, leather, a wood material, a ceramic material, a stone material, or a building material.

The glass is preferably sapphire glass, soda-lime glass, alkali aluminosilicate glass, borosilicate glass, alkali-free glass, crystal glass, or quartz glass, particularly preferably chemically strengthened soda-lime glass, chemically strengthened alkali aluminosilicate glass, and chemically bonded borosilicate glass.

The resin is preferably acrylic resin or polycarbonate.

In one embodiment, in a case where the article to be produced is an optical member, the material constituting the surface of the base material may be a material for optical members, such as glass or transparent plastic. In a case where the article to be produced is an optical member, some layer (or film) such as a hard coat layer or an antireflection layer may be formed on the surface (outermost layer) of the base material. Either a single layer or a multi-layered antireflection layer may be used for the antireflection layer. Examples of inorganic materials that may be used for the antireflection layer are $SiO_2$, SiO, $ZrO_2$, $TiO_2$, TiO, $Ti_2O_3$, $Ti_2O_3$, $Al_2O_3$, $Ta_2O_3$, $CeO_2$, MgO, $Y_2O_3$, $SnO_2$, $MgF_2$, $WO_3$, and SiN. Such an inorganic substance may be used alone or in combination of two or more thereof (for example, as a mixture). In the case of a multi-layered antireflection layer, it is preferable to use $SiO_2$ and/or SiO as the outermost layer. In the case where the article to be produced is an optical glass component for a touch panel, a thin film using a transparent electrode, such as indium tin oxide (ITO) or indium zinc oxide, may be provided on a portion of the surface of the base material (glass). The base material may have an insulating layer, an adhesive layer, a protecting layer, a decorated frame layer (I—CON), an atomizing film layer, a hard coating layer, a polarizing film, a phase difference film, a liquid crystal display module, or the like, depending on the specific specifications and the like.

For example, such a base material may include any material originally having a hydroxyl group at least on a surface portion thereof. Examples of such any material include glass, as well as a metal (in particular, base metal) where a natural oxidized film or a thermal oxidized film is to be formed on the surface, ceramics and a semiconductor. Alternatively, when the base material has a hydroxyl group but insufficiently or when the base material originally does not have any hydroxyl group, as in a resin and the like, the base material may be subjected to any pre-treatment to thereby introduce or increase a hydroxyl group onto the surface of the base material. Examples of such a pre-treatment include a plasma treatment (for example, corona discharge) and ion beam irradiation. Such a plasma treatment may be suitably utilized to not only introduce or increase a hydroxyl group onto the surface of the base material, but also clean the surface of the base material (removal of foreign substances and the like). Another example of such a pre-treatment includes a method involving forming an interface adsorbent having a carbon-carbon unsaturated bonding group, in the form of a monomolecular film, on the surface of the base material in advance according to a LB method (Langmuir-Blodgett method), a chemical adsorption method, or the like, and thereafter cleaving an unsaturated bond under an atmosphere containing oxygen, nitrogen, and the like.

Alternatively, for example, the base material may include, at least on a surface portion thereof, a silicone compound having at least another reactive group, such as a Si—H group, or a material including alkoxysilane.

The shape of the base material is not limited. Further, the surface region of the base material on which the surface-treating layer is to be formed may be at least a part of the surface of the base material, and can be appropriately determined depending on the applications and specific specifications of the article to be produced.

Next, a method of forming a surface-treating layer on a surface of such a base material will be described. The method of forming the surface-treating layer includes a step of supplying the surface-treating agent to the surface of the base material to form the surface-treating layer on the surface of the base material. More specifically, a film of the surface-treating agent is formed, and this film is post-treated as necessary, thereby forming a surface-treating layer from the surface-treating agent of the present disclosure.

The method of forming a film of the surface-treating agent is not limited. For example, a wet coating method and a dry coating method may be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating according to an atmospheric pressure plasma method may also be made.

In the case of using the dry coating method, the surface-treating agent may be subjected to the dry coating method as-is, or may be diluted with the solvent exemplified for the wet coating method before being subjected to the dry coating method. For example, the surface-treating agent may be deposited as-is (usually by vacuum deposition) or may be deposited (usually by vacuum deposition) using a pellet-like substance impregnated with the surface-treating agent on a metal porous body or a ceramic porous body such as iron or copper.

In a preferable embodiment, a deposition method is used to form the film of the surface-treating agent, more preferably at least one of CVD and radio frequency heating (in particular, resistive heating, electron beam), particularly preferably an electron beam.

Examples of the post-treatment include heat treatment. The temperature of the heat treatment is not limited, and may be, for example, 60 to 250° C., preferably 100° C. to 180° C. The time of the heat treatment time is not limited, and may be, for example, 30 minutes to 5 hours, preferably 1 to 3 hours.

The thickness of the surface-treating layer is not limited. In the case of an optical member, the thickness of the surface-treating layer is in the range of 1 to 50 nm, preferably 1 to 30 nm, more preferably 1 to 15 nm, from the viewpoint of the optical performance, surface lubricity, friction durability and antifouling property.

As described above, a surface-treating layer is formed on the surface of the base material by using the surface-treating agent.

In one embodiment, the article of the present disclosure is an optical material having a surface-treating layer as the outermost layer.

Example of the optical material, in addition to the optical material for the display and the like, preferably include a wide variety of optical materials: a display such as a cathode ray tube (CRT; for example, a personal computer monitor), a liquid crystal display, a plasma display, an organic EL display, an inorganic thin-film EL dot matrix display, a rear projection display, a vacuum fluorescent display (VFD), a field emission display (FED), or a protective plate of such a display, or those having a surface treated with an antireflection film.

The article having the surface-treating layer is not limited, and may be an optical member. Examples of the optical member include the following: lenses such as eyeglasses; front surface protective plates for displays such as PDPs and LCDs, antireflection plates, polarizing plates, anti-glare plates; touch panel sheets for devices such as mobile phones and personal digital assistants; disc surfaces of optical disc such as Blu-ray® disc, DVD disc, CD-R, MO; optical fibers; and clock display surfaces.

Further, the article having the surface-treating layer may be a medical equipment or a medical material.

The articles obtained by using the surface-treating agent of the present disclosure have been described above in detail. It should be noted that the application, usage and production method of the surface-treating agent of the present disclosure are not limited to those exemplified above.

EXAMPLES

The present disclosure will be described by way of Examples, but the present disclosure is not limited to such Examples. In the present Examples, all of the chemical formulae shown below represent average compositions, and the occurrence order of the repeating unit constituting the perfluoropolyether (($CF_2CF_2CF_2O$), ($CF_2CF_2O$), ($CF_2O$), etc.) is not limited.

Synthesis Example 1

The following compound (A) was synthesized according to the method disclosed in Patent Literature 1. A product (A) obtained by the synthesis contained the following compounds (B) to (I):

Compound (A)

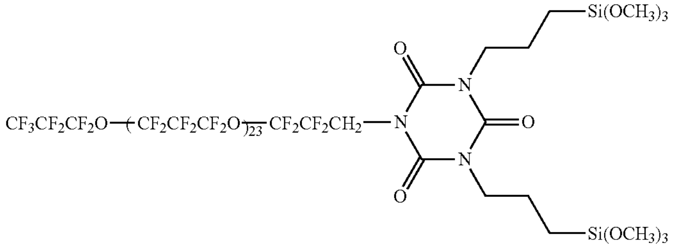

Compound (B)

$CF_3CF_2CF_2O-(CF_2CF_2CF_2O)_{23}-CF_2CF_2CH_2OSi(OCH_3)_3$

Compound (C)

$(H_3CO)_3SiOCH_2CF_2CF_2O-(CF_2CF_2CF_2O)_{23}-CF_2CF_2CH_2OSi(OCH_3)_3$

Compound (D)

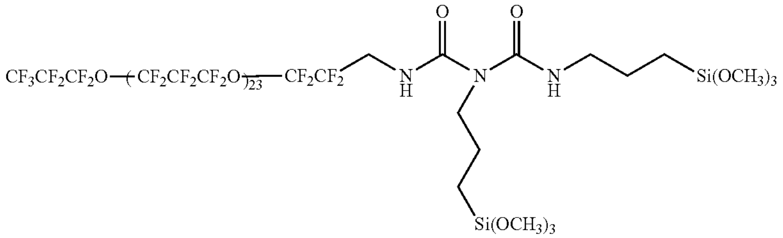

Compound (E)

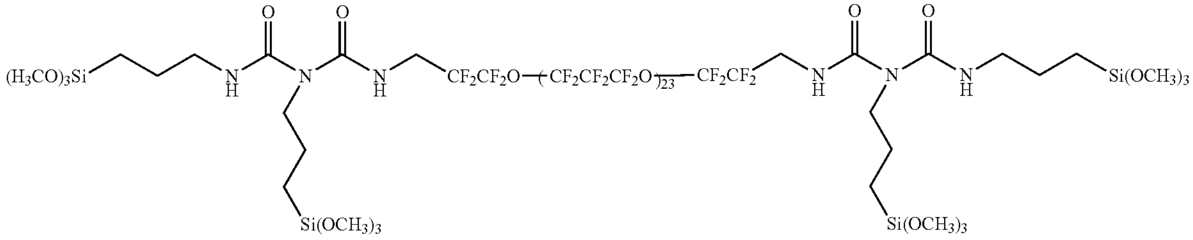

Compound (F)

$CF_3CF_2CF_2O-(CF_2CF_2CF_2O)_{23}-CF_2CF_2CF_3$

Compound (G)

$CF_3CF_2CF_2O-(CF_2CF_2CF_2O)_{23}-CF_2CF_2CH_2OSO_2CF_3$

Compound (H)

$CF_3SO_3CH_2CF_2CF_2O-(CF_2CF_2CF_2O)_{23}-CF_2CF_2CH_2OSO_2CF_3$

Compound (I)

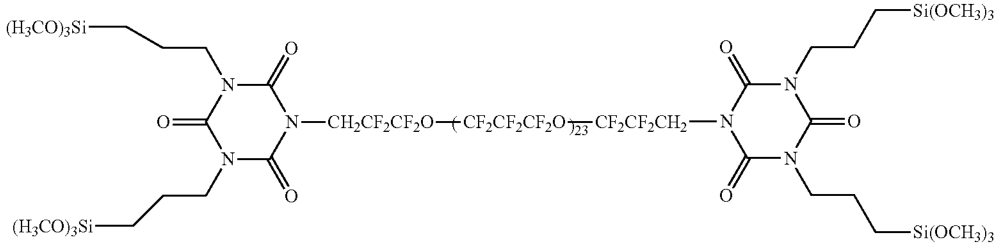

The composition (molar ratio) of the product (A) was 61% for the compound (A), 2% for the compound (B), 2% for the compound (D), 2% for the compound (E), and 20% for the compound (F), and 13% for the compound (I).

The product (A) obtained in Synthesis Example 1 was dissolved in hydrofluoroether (Novec HFE 7200, manufactured by 3M Company) so that the concentration of the product (A) was 20 wt % thereby preparing a chemical solution (A).

Synthesis Example 2

Next, according to the method disclosed in Patent Literature 1, the compound (A) was synthesized and purified to obtain a product (B). The composition (molar ratio) of the product (B) obtained by the synthesis was 91% for the compound (A), 4% for the compound (B), and 5% for the compound (D).

The product (B) obtained in Synthesis Example 2 was dissolved in hydrofluoroether (Novec HFE 7200, manufactured by 3M Company) so that the concentration of the product (B) was 20 wt % thereby preparing a chemical solution (B).

Example 1-(1)

A mixture containing the following compound (J) (91.0 mol %) and compound (K) (9.0 mol %) was dissolved in hydrofluoroether (Novec HFE 7200, manufactured by 3M Company) so that the concentration thereof was 20 wt % thereby preparing a chemical solution (C).

Compound (J)

$$CF_3O{-\!\!-}(CF_2CF_2O)_m(CF_2O)_nCF_2CH_2OCH_2CH_2CH_2Si(CH_2CH_2CH_2Si(OCH_3)_3)_3$$

(m = 22, n = 19)

Compound (K)

$$((H_3CO)_3SiCH_2CH_2CH_2)_3SiCH_2CH_2CH_2OCH_2CF_2O{-\!\!-}(CF_2CF_2O)_m(CF_2O)_nCF_2CH_2OCH_2CH_2CH_2Si(CH_2CH_2CH_2Si(OCH_3)_3)_3$$

(m = 22, n = 19)

The chemical solution (A) and the chemical solution (C) were sufficiently mixed at a weight ratio of 8:2 to obtain a surface treatment liquid (A). Then, it was vacuum-deposited on a chemically strengthened glass ("Gorilla" glass manufactured by Corning, thickness 0.7 mm). The vacuum deposition was performed at a pressure of $3.0\times10^{-3}$ Pa, and silicon dioxide was first deposited at a thickness of 7 nm on the surface of the chemically strengthened glass to form a silicon dioxide film, and then 2 mg of the surface-treating agent (A) was deposited per sheet of chemically strengthened glass (55 mm×100 mm). Then, the chemically strengthened glass with a vapor deposition film was heated at 140° C. for 30 minutes in a thermostatic chamber in the air. Thereby, the vapor deposition film was cured and a base material (1) having a surface-treating layer was obtained.

Example 1-(2)

A base material (2) was obtained in the same manner as in the production of the base material (1) of Example 1-(1), except that the chemical solution (A) and the chemical solution (C) were sufficiently mixed at a weight ratio of 5:5.

Example 2-(1)

A base material (3) was obtained in the same manner as in the production of the base material (1) of Example 1-(1), except that the chemical solution (B) and the chemical solution (C) were sufficiently mixed at a weight ratio of 9:1.

Example 2-(2)

A base material (4) was obtained in the same manner as in the production of the base material (1) of Example 1-(1), except that the chemical solution (B) and the chemical solution (C) were sufficiently mixed at a weight ratio of 8:2.

Example 2-(3)

A base material (5) was obtained in the same manner as in the production of the base material (1) of Example 1-(1), except that the chemical solution (B) and the chemical solution (C) were sufficiently mixed at a weight ratio of 7:3.

Example 2-(4)

A base material (6) was obtained in the same manner as in the production of the base material (1) of Example 1-(1), except that the chemical solution (B) and the chemical solution (C) were sufficiently mixed at a weight ratio of 5:5.

Example 2-(5)

A base material (7) was obtained in the same manner as in the production of the base material (1) of Example 1-(1), except that the chemical solution (B) and the chemical solution (C) were sufficiently mixed at a weight ratio of 3:7.

Example 3-(1)

A mixture containing the following compound (L) (91.0 mol %) and compound (M) (9.0 mol %) was dissolved in hydrofluoroether (Novec HFE 7200, manufactured by 3M Company) so that the concentration thereof was 20 wt % thereby preparing a chemical solution (D).

Compound (L)

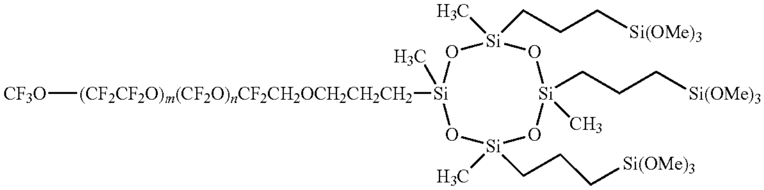

(m = 22, n =19)

Compound (M)

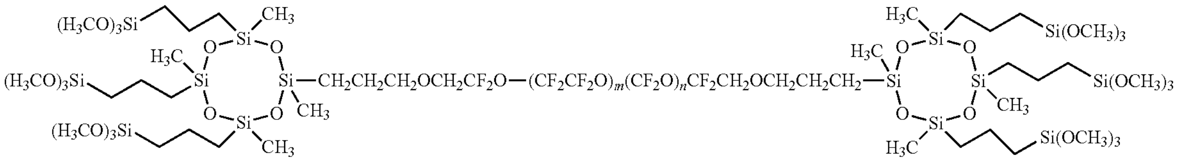

(m = 22, n =19)

A base material (8) was obtained in the same manner as in the production of the base material (1) of Example 1-(1), except that the chemical solution (B) and the chemical solution (D) were sufficiently mixed at a weight ratio of 8:2.

Example 3-(2)

A base material (9) was obtained in the same manner as in the production of the base material (1) of Example 1-(1), except that the chemical solution (B) and the chemical solution (D) were sufficiently mixed at a weight ratio of 7:3.

Example 3-(3)

A base material (10) was obtained in the same manner as in the production of the base material (1) of Example 1-(1), except that the chemical solution (B) and the chemical solution (D) were sufficiently mixed at a weight ratio of 5:5.

Example 4-(1)

A mixture of the compound (J), the compound (K), and the compound (N) having a composition ratio (molar ratio) of 82%, 8%, and 10%, respectively, was dissolved in hydrofluoroether (Novec HFE 7200, manufactured by 3M Company) so that the concentration thereof was 20 wt % thereby preparing a chemical solution (E).

Compound (N)

$$CF_3O—(CF_2CF_2O)_m(CF_2O)_nCF_3$$

(m = 22, n = 19)

A base material (11) was obtained in the same manner as in the production of the base material (1) of Example 1-(1), except that the chemical solution (B) and the chemical solution (E) were sufficiently mixed at a weight ratio of 5:5.

Example 4-(2)

A base material (12) was obtained in the same manner as in the production of the base material (1) of Example 1-(1), except that the chemical solution (B) and the chemical solution (E) were sufficiently mixed at a weight ratio of 4:6.

Example 4-(3)

A base material (13) was obtained in the same manner as in the production of the base material (1) of Example 1-(1), except that the chemical solution (B) and the chemical solution (E) were sufficiently mixed at a weight ratio of 3:7.

Example 4-(4)

A base material (14) was obtained in the same manner as in the production of the base material (1) of Example 1-(1), except that the chemical solution (B) and the chemical solution (E) were sufficiently mixed at a weight ratio of 2:8.

Comparative Example 1-(1)

The following compound (O) was dissolved in hydrofluoroether (Novec HFE 7200, manufactured by 3M Company) so that the concentration was 20 wt % thereby preparing a chemical solution (F).

Compound (O)

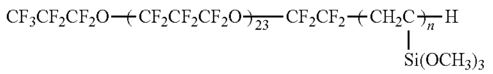

(n = 1 ~ 6)

A base material (15) was obtained in the same manner as in the production of the base material (1) of Example 1-(1), except that the chemical solution (A) and the chemical solution (F) were sufficiently mixed at a weight ratio of 8:2.

Comparative Example 1-(2)

A base material (16) was obtained in the same manner as in the production of the base material (1) of Example 1-(1), except that the chemical solution (A) and the chemical solution (F) were sufficiently mixed at a weight ratio of 5:5.

Comparative Example 2-(1)

The following compound (P) was dissolved in hydrofluoroether (Novec HFE 7200, manufactured by 3M Company) so that the concentration was 20 wt % thereby preparing a chemical solution (G).

Compound (P)

$$CF_3CF_2CF_2O-(CF_2CF_2CF_2O)_{23}-CF_2CF_2CH_2OCH_2CH_2CH_2Si(CH_2CH_2CH_2Si(OCH_3)_3)_3$$

A base material (17) was obtained in the same manner as in the production of the base material (1) of Example 1-(1), except that the chemical solution (A) and the chemical solution (G) were sufficiently mixed at a weight ratio of 8:2.

Comparative Example 2-(2)

A base material (18) was obtained in the same manner as in the production of the base material (1) of Example 1-(1), except that the chemical solution (A) and the chemical solution (G) were sufficiently mixed at a weight ratio of 5:5.

Comparative Example 3-(1)

The following compound (Q) was dissolved in hydrofluoroether (Novec HFE 7200, manufactured by 3M Company) so that the concentration was 20 wt % thereby preparing a chemical solution (H).

Compound (Q)

$$CF_3CF_2CF_2O-(CF_2CF_2CF_2O)_{23}-CF_2CF_2CH_2OCH_2CH_2CH_2Si(OCH_3)_3$$

A base material (19) was obtained in the same manner as in the production of the base material (1) of Example 1-(1), except that the chemical solution (B) and the chemical solution (H) were sufficiently mixed at a weight ratio of 8:2.

Comparative Example 3-(2)

A base material (20) was obtained in the same manner as in the production of the base material (1) of Example 1-(1), except that the chemical solution (B) and the chemical solution (H) were sufficiently mixed at a weight ratio of 5:5.

Comparative Example 4-(1)

The following compound (R) was dissolved in hydrofluoroether (Novec HFE 7200, manufactured by 3M Company) so that the concentration was 20 wt % thereby preparing a chemical solution (I).

Compound (R)

$$CF_3CF_2CF_2O-(CF(CF_3)CF_2O)_{23}-CF(CF_3)CH_2OCH_2CH_2CH_2Si(OCH_3)_3$$

A base material (21) was obtained in the same manner as in the production of the base material (1) of Example 1-(1), except that the chemical solution (B) and the chemical solution (I) were sufficiently mixed at a weight ratio of 8:2.

Comparative Example 4-(2)

A base material (22) was obtained in the same manner as in the production of the base material (1) of Example 1-(1), except that the chemical solution (B) and the chemical solution (I) were sufficiently mixed at a weight ratio of 5:5.

Comparative Example 5-(1)

A base material (23) was obtained in the same manner as in the production of the base material (1) of Example 1-(1) using only the chemical solution (D).

Table 1 below shows the chemical solutions used in the respective Examples and Comparative Examples and their weight ratios.

TABLE 1

| | Base | Chemical solution (weight ratio) | | | | | | | | |
|---|---|---|---|---|---|---|---|---|---|---|
| | material | A | B | C | D | E | F | G | H | I |
| Example 1-1 | (1) | 8 | | 2 | | | | | | |
| Example 1-2 | (2) | 5 | | 5 | | | | | | |
| Example 2-1 | (3) | | 9 | 1 | | | | | | |
| Example 2-2 | (4) | | 8 | 2 | | | | | | |
| Example 2-3 | (5) | | 7 | 3 | | | | | | |
| Example 2-4 | (6) | | 5 | 5 | | | | | | |
| Example 2-5 | (7) | | 3 | 7 | | | | | | |
| Example 3-1 | (8) | | 8 | | 2 | | | | | |
| Example 3-2 | (9) | | 7 | | 3 | | | | | |
| Example 3-3 | (10) | | 5 | | 5 | | | | | |
| Example 4-1 | (11) | | 5 | | | 5 | | | | |
| Example 4-2 | (12) | | 4 | | | 6 | | | | |
| Example 4-3 | (13) | | 3 | | | 7 | | | | |
| Example 4-4 | (14) | | 2 | | | 8 | | | | |
| Comparative Example 1-1 | (15) | 8 | | | | | 2 | | | |
| Comparative Example 1-2 | (16) | 5 | | | | | 5 | | | |
| Comparative Example 2-1 | (17) | 8 | | | | | | 2 | | |
| Comparative Example 2-2 | (18) | 5 | | | | | | 5 | | |
| Comparative Example 3-1 | (19) | | 8 | | | | | | 2 | |
| Comparative Example 3-2 | (20) | | 5 | | | | | | 5 | |
| Comparative Example 4-1 | (21) | | 8 | | | | | | | 2 |
| Comparative Example 4-2 | (22) | | 5 | | | | | | | 5 |
| Comparative Example 5-1 | (23) | | | | 10 | | | | | |

Test Example 1

Method of Measuring Static Contact Angle of Water

The static contact angle of water was measured by the following method using a fully automatic contact angle meter DropMaster700 (manufactured by Kyowa Interface Science Co., Ltd.). It was determined by dropping 2 μL of water from a microsyringe onto a horizontally placed base material, and photographing a still image 1 second after the dropwise addition with a video microscope. The static contact angle of water was measured at five different points in the surface-treating layer of the base material, and the average value thereof was calculated and used. Initial values were measured for the base materials (1) to (23). The results are shown in Table 2 below. The measurement was carried out in the same manner in Test Examples 3 to 5.

Test Example 2

Evaluation of Surface Lubricity (Measurement of Dynamic Friction Coefficient (COF))

The dynamic friction coefficient was measured for each of the base materials (1) to (23). Specifically, a dynamic friction coefficient (-) was measured using paper as friction block using a surface tester (FPT-1 manufactured by Labthink) in accordance with ASTM D4917. Specifically, the base material on which the surface-treating layer is formed was placed horizontally, friction paper (2 cm×2 cm) was brought into contact with the exposed upper surface of the surface-treating layer, a load of 200 gf was applied thereon, and then the friction paper was moved in equilibrium at a speed of 500 mm/sec under the condition where the load was applied, and the dynamic friction coefficient was measured. The results are shown in Table 2 below.

Test Example 3

Evaluation of Friction Durability (Eraser Durability)

The friction durability was evaluated by an eraser friction durability test for each of the base materials (1) to (23). Specifically, the sample article on which the surface-treating layer is formed was placed horizontally, an eraser (KESHI-70, plane dimension: 1 cm×1.6 cm, manufactured by Kokuyo) is brought into contact with the surface of the surface-treating layer, a load of 1,000 gf was applied thereon, and then the eraser was reciprocated at a speed of 20 mm/sec while the load was applied. The static contact angle (degree) of water was measured every 500 round trips. The evaluation was stopped at the time point when the measured value of the contact angle was less than 100 degrees. Table 2 shows the number of round trips at the last point in time in which the contact angle exceeded 100 degrees.

Test Example 4

Evaluation of Steel Wool (SW) Friction Durability

Steel wool friction durability evaluation was performed for each of the base materials (1) to (23). Specifically, the base material on which the surface-treating layer is formed was placed horizontally, steel wool (count #0000, size 5 mm×10 mm×10 mm) was brought into contact with the surface-treating layer of the base material, a load of 1,000 gf was applied thereon, and then the steel wool was reciprocated at a speed of 140 mm/sec while the load was applied. The static contact angle (degree) of water was measured every 2000 round trips, and the evaluation was stopped when the measured value of the contact angle was less than 100 degrees. The results are shown in Table 2 below (in the table, the symbol "-" means that measurement was not performed).

Test Example 5

Evaluation of Accelerated Weather Resistance Test

An accelerated weather resistance test was performed for each of the base materials (1) to (23). In the accelerated weather resistance test, UVB irradiation was performed as follows. For UVB irradiation, a UVB-313 lamp (irradiance of 0.63 W/m$^2$ at 310 nm, manufactured by Q-Lab) was used, the distance between the lamp and the surface-treating layer of the base material was set to 5 cm, and the temperature of the plate on which the substrate was placed was 63° C. Although UVB irradiation was performed continuously, when measuring the static contact angle of water, the base material was taken out once and the surface-treating layer after UVB irradiation for a predetermined period of time was wiped back and forth 5 times with a Kimwipe (trade name, Jujo Kimberly) fully soaked in pure water and wiped back and forth 5 times with another Kimwipe fully soaked in ethanol and allowed to dry. Immediately thereafter, the static contact angle of water was measured. The evaluation was performed every 24 hours from the start of UVB irradiation until the static contact angle of water fell below 90 degrees. Table 2 shows the cumulative UVB irradiation time up to the last point in time in which the contact angle exceeded 90 degrees.

TABLE 2

| Treament base material | Static contact angle of water degrees | Dynamic friction coefficient (−) | Eraser durability times | SW friction durability times | Accelerated weather resistance hours |
|---|---|---|---|---|---|
| Base material (1) | 115 | 0.045 | 4500 | 8000 | 504 |
| Base material (2) | 115 | 0.041 | 5500 | 12000 | 456 |
| Base material (3) | 115 | 0.048 | 5500 | 12000 | 600 |
| Base material (4) | 115 | 0.045 | 6000 | 14000 | 552 |
| Base material (5) | 115 | 0.043 | 6000 | 16000 | 528 |
| Base material (6) | 115 | 0.042 | 6000 | 16000 | 480 |
| Base material (7) | 114 | 0.038 | 6500 | 16000 | 408 |
| Base material (8) | 115 | 0.050 | 5500 | 12000 | 528 |
| Base material (9) | 115 | 0.046 | 6000 | 12000 | 480 |
| Base material (10) | 115 | 0.042 | 6000 | 14000 | 432 |
| Base material (11) | 115 | 0.039 | 6000 | 16000 | 432 |
| Base material (12) | 115 | 0.037 | 6500 | 16000 | 408 |
| Base material (13) | 115 | 0.035 | 7000 | 16000 | 384 |
| Base material (14) | 115 | 0.033 | 7500 | 18000 | 360 |
| Base material (15) | 115 | 0.070 | 3000 | 6000 | 528 |
| Base material (16) | 114 | 0.071 | 2500 | 6000 | 432 |
| Base material (17) | 115 | 0.071 | 3000 | 6000 | 504 |
| Base material (18) | 115 | 0.071 | 3500 | 6000 | 456 |
| Base material (19) | 114 | 0.071 | 3500 | 6000 | 480 |
| Base material (20) | 113 | 0.070 | 3000 | 4000 | 408 |
| Base material (21) | 114 | 0.112 | 2000 | 6000 | 504 |
| Base material (22) | 114 | 0.143 | 1500 | 4000 | 456 |
| Base material (23) | 115 | 0.030 | 6000 | 12000 | 72 |

As can be understood from the results in Table 2 above, it has been confirmed that base materials (1) to (14) treated with the surface-treating agents of the present disclosure (Examples 1-(1) to (2), 2-(1) to (5), 3-(1) to (3), 4-(1) to (4)), containing the compound (A) corresponding to the compound (I), the compound (J) and the compound (L) having —$OCF_2$—corresponding to the compound (II), exhibit excellent abrasion resistance (eraser durability 4000 cycles or more; SW friction durability: 8000 cycles or more), excellent surface lubricity (dynamic friction coefficient of 0.05 or less), and excellent UV resistance (accelerated weathering resistance: 350 hours or more). On the other hand, the base materials (15) to (22) treated with the surface-treating agents containing the compound (O), the compound (P), the compound (Q), or the compound (R)

having a perfluoropolyether group not containing —$OCF_2$—, (Comparative Examples 1-(1) to (2), Comparative Examples 2-(1) to (2), Comparative Examples 3-(1) to (2), Comparative Examples 4-(1) to (2)) and the base material (23) treated with the surface-treating agent (Comparative Example 5-(1)) containing only a mixture of the compound (L) and the compound (M) did not give satisfactory results in at least one test. From this, it was confirmed that the surface-treating agent of the present disclosure is able to demonstrate a high level of balanced abrasion resistance, surface lubricity, and UV resistance by mixing the compound (I) with a perfluoropolyether group-containing silane compound containing —$OCF_2$—compared to the conventional products.

The present disclosure includes the following embodiments.

[1]A surface-treating agent comprising:

(I) a compound represented by the following formula (I-1) or formula (I-2):

(I-1)

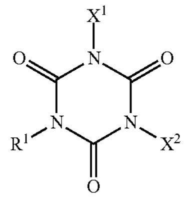

(I-2)

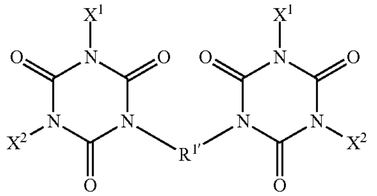

wherein:

$R^1$ is a monovalent organic group containing a polyether chain;

$R^{1'}$ is a divalent organic group containing a polyether chain;

the polyether chain is a chain represented by the formula:

$$—(OC_6F_{12})_{m11}—(OC_5F_{10})_{m12}—(OC_4F_8)_{m13}—$$
$$—(OC_3X^{10}{}_6)_{m14}—(OC_2F_4)_{m15}—(OCF_2)_{m16}—$$

wherein m11, m12, m13, m14, m15 and m16 are each independently 0 or an integer of 1 or more;

$X^{10}$ is independently H, F or Cl; and the occurrence order of the respective repeating units is not limited;

$X^1$ is independently a silane-containing reactive crosslinkable group; and $X^2$ independently represents a monovalent group; and (II) a perfluoropolyether group-containing silane compound having an $OCF_2$ unit.

[2] The surface-treating agent according to the above [1], wherein $R^1$ is a group represented by:

$$R^3—(OR^2)_a—L—$$

wherein $(OR^2)_a$ is a polyether chain;

$R^3$ is an alkyl group or a fluorinated alkyl group; and

L is a single bond or a divalent linking group; and $R^{1'}$ is a group represented by:

$$—L'—(OR^2)_a—L—$$

wherein $(OR^2)_a$ is a polyether chain;

L is independently a single bond or a divalent linking group; and

L' is independently a single bond or a divalent linking group.

[3] The surface-treating agent according to the above [2], wherein $(OR^2)_a$ is a group represented by:

$$—(OC_4F_8)_{m13}—(OC_3F_6)_{m14}—(OC_2F_4)_{m15}—(OCF_2)_{m16}—$$

wherein m13 and m14 are each an integer of 0 to 30, and m15 and m16 are each an integer of 1 to 200; m13 to m16 are 5 or more in total; and the occurrence order of the respective repeating units is not limited.

[4] The surface-treating agent according to the above [2] or [3], wherein L is a group represented by:

$$—(CX^{121}X^{122})_o—(L^1)_p—(CX^{123}X^{124})_q—$$

wherein $X^{121}$ to $X^{124}$ are each independently H, F, OH, or —$OSi(OR^{125})_3$ wherein three $R^{125}$ are each independently an alkyl group having 1 to 4 carbon atoms;

$L^1$ is —C(═O) NH—, —NHC(═O)—, —O—, —C(═O)O—, —OC(═O)—, —OC(═O)O—, or —NHC(═O)NH—, in which the left side of each bond is bonded to $CX^{121}X^{122}$;

o is an integer of 0 to 10;

p is 0 or 1; and q is an integer of 1 to 10; and

L' is a group represented by:

$$—(CX^{126}X^{127})_r—(CX^{121}X^{122})_o—(L^1)_p—(CX^{123}X^{124})_q—$$

wherein $X^{121}$ to $X^{124}$, $L^1$, o, p, and q have the same meanings as defined in L;

$X^{126}$ and $X^{127}$ are each independently H, F or Cl; and r is an integer of 1 to 6.

[5] The surface-treating agent according to any one of the above [1] to [4], wherein $X^1$ is a group represented by the formula:

$$—L^2—\{Si(R^a)_s(R^b)_t(R^c)_u(R^d)_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^d$ is the same or different and is —O—, —NH—, —C≡C—, or a silane bond;

s, t and u are the same or different and are each 0 or 1;

v is an integer of 0 to 3;

n is an integer of 1 to 20;

in a case where n is 1, s+t+u is 3 and v is 0;

in a case where n is 2 to 20, s+t+u is the same or different and is 0 to 2, and v is the same or different and is 0 to 2; and in a case where v is an integer of 1 or more, at least two Si atoms are bonded to each other via $R^d$ in a linear, ladder, cyclic, or polycyclic form.

[6] The surface-treating agent according to any one of the above [1] to [5], wherein $X^1$ is a group represented by $-L^2-SiR^5_3$, $-L^2-Si(OR^6)_3$, $-L^2-Si(NR^6_2)_3$ or $-L^2-Si(OCOR^6)_3$ wherein $L^2$ is $—C_2H_4—$, $—C_3H_6—$, $—C_4H_8—O—CH_2—$, $—COO—CH_2—CH(OH)—CH_2—$, $—CH_2—$, or $—C_4H_8—$;

$R^5$ is a halogen atom; and $R^6$ is independently an alkyl group having 1 to 4 carbon atoms.

[7] The surface-treating agent according to any one of the above [1] to [4], wherein $X^1$ is a silane-containing reactive crosslinkable group represented by the formula:

$$-L^2-\{Si(R^a)_s(R^b)_t(R^c)_u(R^{d'})_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^{d'}$ are the same or different, and is a group represented by $—Z—SiR^{d1'}_{p'}R^{d2'}_{q'}R^{d3'}_{r'}$ wherein Z is the same or different and is a single bond or a divalent linking group;

$R^{d1'}$ is the same or different and is $R^{d''}$;

$R^{d''}$ has the same meaning as $R^{d'}$;

the number of Si atoms linearly linked via a Z group in $R^{d'}$ is at most 5;

$R^{d2'}$ is the same or different and is a hydroxyl group or a hydrolyzable group;

$R^{d3'}$ is the same or different and is a hydrogen atom or a lower alkyl group;

p' is the same or different and is an integer of 0 to 3;

q' is the same or different and is an integer of 0 to 3; and r' is the same or different and is an integer of 0 to 3, provided that the sum of p', q' and r' is 3.

s, t and u are the same or different and are each 0 or 1;

v is an integer of 0 to 3; and n is an integer of 1 to 20.

[8] The surface-treating agent according to any one of the above [1] to [4], wherein $X^1$ is a silane-containing reactive crosslinkable group represented by the formula:

$$—L^6—\{C(R^{a6})_{s6}(R^{b6})_{t6}(R^{c6})_{u6}(R^{d6})_{v6}\}_{n6}$$

wherein $L^6$ is a single bond or a divalent linking group;

$R^{a6}$, $R^{b6}$ and $R^{c6}$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, a glycidyl group having 3 to 10 carbon atoms, $OCOR^{67}$, wherein $R^{67}$ is an alkyl group having 1 to 6 carbon atoms, OH or $—Y^6—SiR^{65}_{j6}R^{66}_{3-j6}$;

$R^{d6}$ is the same or different and is —O—, —NH—, —C≡C—, or $—Z^6—CR^{61}_{p6}R^{62}_{q6}R^{63}_{r6}$;

$Z^6$ is the same or different and is an oxygen atom or a divalent organic group;

wherein $R^{61}$ is the same or different and represents $R^{d6'}$;

$R^{d6'}$ has the same meaning as $R^{d6}$;

the number of C atoms linearly linked via a $Z^6$ group in $R^{d6}$ is at most 5;

$R^{62}$ is the same or different and is $—Y^6—SiR^{65}_{j6}R^{66}_{3-j6}$;

$Y^6$ is the same or different and is a divalent organic group;

$R^{65}$ is the same or different and is a hydroxyl group or a hydrolyzable group;

$R^{66}$ is the same or different and is a hydrogen atom or a lower alkyl group;

j6 with respect to each $(—Y^6—SiR^{65}_{j6}R^{66}_{3-j6})$ unit is independently an integer of 1 to 3;

$R^{63}$ is the same or different and is a hydrogen atom or a lower alkyl group;

p6 is the same or different and is an integer of 0 to 3;

q6 is the same or different and is an integer of 0 to 3;

r6 is the same or different and is an integer of 0 to 3; and s6, t6 and u6 are the same or different and are each 0 or 1, v6 is an integer of 0 to 3, and n6 is an integer of 1 to 20, provided that in the formula, at least two $—Y^6—SiR^{65}_{j6}R^{66}_{3-j6}$ are present.

[9] The surface-treating agent according to any one of the above [1] to [8], wherein (II) the perfluoropolyether group-containing silane compound having an $OCF_2$ unit is a compound represented by the following formula (A1), (A2), (B1), (B2), (C1), (C2), (D1), (D2), or (E1):

(A1)

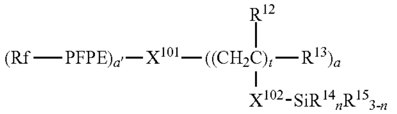

(A2)

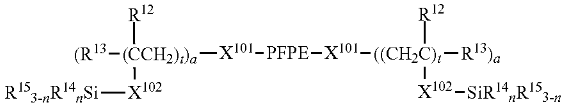

(B1)

$$(Rf—PFPE)_{\beta'}—X^{105}—(SiR^{14}_nR^{15}_{3-n})_\beta$$

(B2)

$$(R^{15}_{3-n}R^{14}_nSi)_\beta—X^{105}—PFPE—X^{105}—(SiR^{14}_nR^{15}_{3-n})_\beta$$

-continued $$(Rf-PFPE)_{\gamma'}-X^{107}-(SiR^{a3}{}_{k}R^{b3}{}_{l}R^{c3}{}_{m})_{\gamma} \quad (C1)$$

$$(R^{c3}{}_{m}R^{b3}{}_{l}R^{a3}{}_{k}Si)_{\gamma}-X^{107}-PFPE-X^{107}-(SiR^{a3}{}_{k}R^{b3}{}_{l}R^{c3}{}_{m})_{\gamma} \quad (C2)$$

$$(Rf-PFPE)_{\delta'}-X^{109}-(CR^{d3}{}_{k'}R^{e3}{}_{l'}R^{f3}{}_{m'})_{\delta} \quad (D1)$$

$$(R^{f3}{}_{m'}R^{e3}{}_{l'}R^{d3}{}_{k'}C)_{\delta}-X^{109}-PFPE-X^{109}-(CR^{d3}{}_{k'}R^{e3}{}_{l'}R^{f3}{}_{m'})_{\delta} \quad (D2)$$

$$(Rf-PFPE-G^{5})_{a5}-Z^{5}-((O-R^{16})_{c5}-SiR^{14}{}_{n}R^{15}{}_{3-n})_{b5} \quad (E1)$$

wherein

Rf is each independently an alkyl group having 1 to 16 carbon atoms optionally substituted with one or more fluorine atoms;

BFBE is a group represented by:

$$-(OC_6F_{12})_{a1}-(OC_5F_{10})_{b1}-(OC_4F_8)_{c1}-(OC_3F_6)_{d1}-(OC_2F_4)_{e1}-(OCF_2)_{f1}-$$

wherein a1, b1, c1, d1 and e1 are each independently an integer of 0 or more and 200 or less, f1 is an integer of 1 or more and 200 or less, and the occurrence order of the respective repeating units in parenthesis with a1, b1, c1, d1, e1 or f1, is not limited in the formula;

$R^{14}$, at each occurrence, is each independently a hydrogen atom or an alkyl group having 1 to 22 carbon atoms;

$R^{15}$, at each occurrence, is each independently a hydroxyl group or a hydrolyzable group;

$R^{13}$, at each occurrence, is each independently a hydrogen atom or a halogen atom;

$R^{12}$, at each occurrence, is each independently a hydrogen atom or a lower alkyl group;

n with respect to each ($-SiR^{14}{}_{n}R^{15}{}_{3-n}$) unit is independently an integer of 0 to 3;

provided that at least one $R^{15}$ is present in formulae (A1), (A2), (B1), and (B2);

$X^{101}$ is each independently a single bond or a di- to decavalent organic group;

$X^{102}$, at each occurrence, is each independently a single bond or a divalent organic group;

t is each independently an integer of 1 to 10;

α is each independently an integer of 1 to 9;

α' is an integer of 1 to 9;

$X^{105}$ is each independently a single bond or a di- to decavalent organic group;

β is each independently an integer of 1 to 9;

β' is an integer of 1 to 9;

$X^{107}$ is each independently a single bond or a di- to decavalent organic group;

γ is each independently an integer of 1 to 9;

γ' is an integer of 1 to 9;

$R^{a3}$, at each occurrence, is each independently $-Z^{3}-SiR^{71}{}_{p}R^{72}{}_{q}R^{73}{}_{r}$;

$Z^3$, at each occurrence, is each independently an oxygen atom or a divalent organic group;

$R^{71}$, at each occurrence, is each independently $R^{a'}$;

$R^{a'}$ has the same meaning as $R^{a3}$;

the number of Si atoms linearly linked via a $Z^3$ group in $R^{a3}$ is at most 5;

$R^{72}$, at each occurrence, is each independently a hydroxyl group or a hydrolyzable group;

$R^{73}$, at each occurrence, is each independently a hydrogen atom or a lower alkyl group;

p, at each occurrence, is each independently an integer of 0 to 3;

q, at each occurrence, is each independently an integer of 0 to 3;

r, at each occurrence, is each independently an integer of 0 to 3;

provided that the sum of p, q and r with respect to ($-Z^{3}-SiR^{71}{}_{p}R^{72}{}_{q}R^{73}{}_{r}$) is 3 and at least one $R^{72}$ is present in formulae (C1) and (C2);

$R^{b3}$, at each occurrence, is each independently a hydroxyl group or a hydrolyzable group;

$R^{c3}$, at each occurrence, is each independently a hydrogen atom or a lower alkyl group;

k, at each occurrence, is each independently an integer of 1 to 3;

l, at each occurrence, is each independently an integer of 0 to 2;

m, at each occurrence, is each independently an integer of 0 to 2;

provided that, in the unit in parentheses with γ, the sum of k, 1 and m is 3;

$X^{109}$ is each independently a single bond or a di- to decavalent organic group;

δ is each independently an integer of 1 to 9;

δ' is an integer of 1 to 9;

$R^{d3}$, at each occurrence, is each independently $-Z^{3'}-CR^{81}{}_{p'}R^{82}{}_{q'ZR}{}^{83}{}_{r'}$;

$Z^3$, at each occurrence, is each independently an oxygen atom or a divalent organic group;

$R^{81}$, at each occurrence, is each independently $R^{d3''}$;

$R^{d3''}$ has the same meaning as $R^{d3}$;

the number of C atoms linearly linked via a $Z^{3'}$ group in $R^{d3}$ is at most 5;

$R^{82}$ is $-Y^{3}-SiR^{85}{}_{j}R^{86}{}_{3-j}$;

$Y^3$, at each occurrence, is independently a divalent organic group;

$R^{85}$, at each occurrence, is each independently a hydroxyl group or a hydrolyzable group;

$R^{86}$, at each occurrence, is each independently a hydrogen atom or a lower alkyl group;

j with respect to each ($-Y^{3}-SiR^{85}{}_{j}R^{86}{}_{3-j}$) unit is independently an integer of 1 to 3;

$R^{83}$, at each occurrence, is each independently a hydrogen atom, a hydroxyl group or a lower alkyl group;

p', at each occurrence, is each independently an integer of 0 to 3;

q', at each occurrence, is each independently an integer of 0 to 3;

r', at each occurrence, is each independently an integer of 0 to 3;

$R^{e3}$, at each occurrence, is each independently $-Y^{3}-SiR^{85}{}_{j}R^{86}{}_{3-j}$;

$R^{f3}$, at each occurrence, is each independently a hydrogen atom, a hydroxyl group or a lower alkyl group;

k', at each occurrence, is each independently an integer of 0 to 3;

l', at each occurrence, is each independently an integer of 0 to 3;

m', at each occurrence, is each independently an integer of 0 to 3, provided that, in the formula, at least one q' is 2 or 3 or at least one l' is 2 or 3;

$G^5$ is $-R^{17}-O-$, $-R^{17}-CONH-$, $-CONH-$, or a single bond;

$R^{17}$ is an alkylene group;

$Z^5$ is an (a5+b5)-valent hydrocarbon group or an (a5+b5)-valent group having 2 or more carbon atoms and having at least one etheric oxygen atom between carbon atoms in the hydrocarbon group;

$R^{16}$ is an alkylene group;

a5 is an integer of 1 or more;

b5 is an integer of 1 or more;

provided that (a5+b5) is 3 or more; and c5 is 0 or 1.

[10] The surface-treating agent according to the above [9], wherein (II) the perfluoropolyether group-containing silane compound having an $OCF_2$ unit is a compound represented by formula (C1) or (C2).

[11] The surface-treating agent according to the above [9] or [10], wherein PFPE is a group represented by:

$$-(OC_4F_8)_{m13}-(OC_3F_6)_{m14}-(OC_2F_4)_{m15}-(OCF_2)_{m16}-$$

wherein m13 and m14 are each an integer of 0 to 30, and m15 and m16 are each an integer of 1 to 200; and the occurrence order of the respective repeating units is not limited.

[12] The surface-treating agent according to any one of the above [1] to [11], further comprising a solvent.

[13] The surface-treating agent according to any one of the above [1] to [12], for use as an antifouling coating agent or a water-proof coating agent.

[14] The surface-treating agent according to any one of the above [1] to [13], which is for vacuum deposition.

[15]A pellet comprising the surface-treating agent according to any one of the above [1] to [14].

[16] An article comprising: a base material; and a layer disposed on a surface of the base material, the layer being formed by the surface-treating agent according to any one of the above [1] to [14].

[17] The article according to the above [16], wherein the article is an optical member.

INDUSTRIAL APPLICABILITY

The present disclosure can be suitably utilized to form a surface-treating layer on a variety of base materials, particularly on a surface of an optical member.

The invention claimed is:

1. A surface-treating agent comprising:

(I) a compound represented by the following formula (I-1) or formula (I-2):

(I-1)

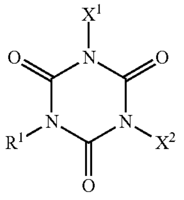

(I-2)

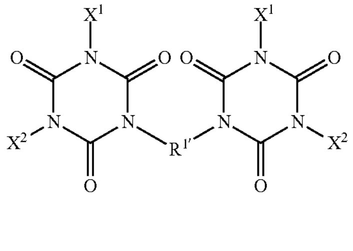

wherein:

$R^1$ is a monovalent organic group containing a polyether chain and is represented by:

$$R^3-(OR^2)_a-L-$$

wherein $(OR^2)_a$ is a polyether chain;

$R^3$ is $CF_3CF_2CF_2-$; L is $-CH_2-$;

$R^{1'}$ is a divalent organic group containing a polyether chain;

the polyether chain is a chain represented by formula:

$$-(OCF_2CF_2CF_2)_{m14}-OCF_2CF_2-$$

wherein m14 is each independently an integer of 1 to 200;

$X^1$ is independently a silane-containing reactive cross-linkable group; and $X^2$ independently represents a monovalent group; and (II) a perfluoropolyether group-containing silane compound having an $OCF_2$ unit represented by the following formula (C1) and a perfluoropolyether group-containing silane compound having an $OCF_2$ unit represented by the following formula (C2):

$$(Rf-PFPE)_{\gamma'}-X^{107}-(SiR^{a3}_3)_\gamma \quad (C1)$$

$$(R^{a3}_3Si)_\gamma-X^{107}-PFPE-X^{107}-(SiR^{a3}_3)_\gamma \quad (C2)$$

wherein

Rf is each independently an alkyl group having 1 to 16 carbon atoms optionally substituted with one or more fluorine atoms;

PFPE is a group represented by:

$$-(OCF_2CF_2)_{e1}-(OCF_2)_{f1}-$$

wherein e1 and f1 are each independently an integer of 1 or more and 200 or less, and the occurrence order of the respective repeating units in parenthesis with e1 or f1, is not limited in the formula;

$X^{107}$ is each independently $-(CH_2)_{s'}-O-(CH_2)_{t'}-$, or $-CF_2-(CH_2)_{s'}-O-(CH_2)_{t'}-$;

s' is an integer of 1 to 20;

t' is an integer of 1 to 20;

$\gamma$ is each independently an integer of 1 to 9;

$\gamma'$ is an integer of 1 to 9;

$R^{a3}$, at each occurrence, is each independently $-Z^3-SiR^{71}_pR^{72}_qR^{73}_r$;

$Z^3$, at each occurrence, is each independently an oxygen atom or a divalent organic group;

$R^{71}$, at each occurrence, is each independently $R^{a'}$;

$R^{a'}$ has the same meaning as $R^{a3}$;

the number of Si atoms linearly linked via a $Z^3$ group in $R^{a3}$ is at most 5;

$R^{72}$, at each occurrence, is each independently a hydroxyl group or a hydrolyzable group;

$R^{73}$, at each occurrence, is each independently a hydrogen atom or a lower alkyl group;

p, at each occurrence, is each independently an integer of 0 to 3;

q, at each occurrence, is each independently an integer of 0 to 3;

r, at each occurrence, is each independently an integer of 0 to 3;

provided that the sum of p, q and r with respect to ($—Z^3—SiR^{71}{}_pR^{72}{}_qR^{73}{}_r$) is 3 and at least one $R^{72}$ is present in formulae (C1) and (C2);

wherein the perfluoropolyether group-containing silane compound having an $OCF_2$ unit is a compound different from the compound represented by the formula (I-1) or formula (I-2), and the weight ratio of (I) to (II) is 2:8 to 9:1.

2. The surface-treating agent according to claim 1, wherein $R^{1'}$ is a group represented by:

$$—L'—(OR^2)_a—L—$$

wherein $(OR^2)_a$ is a polyether chain;

L is $—CH_2—$; and

L' is independently a single bond or a divalent linking group.

3. The surface-treating agent according to claim 2, wherein L' is a group represented by:

$$—(CX^{126}X^{127})_r—(CX^{121}X^{122})_o—(L^1)_p—(CX^{123}X^{124})_q—$$

wherein $L^1$ is $—CH_2—$;

$X^{121}$ to $X^{124}$ are each independently H, F, OH, or $—OSi(OR^{125})_3$ wherein three $R^{125}$ are each independently an alkyl group having 1 to 4 carbon atoms;

o is an integer of 0 to 10;

p is 0 or 1;

q is an integer of 1 to 10;

$X^{126}$ and $X^{127}$ are each independently H, F or Cl; and r is an integer of 1 to 6.

4. The surface-treating agent according to claim 1, wherein $X^1$ is a group represented by the formula:

$$—L^2—\{Si(R^a)_s(R^b)_t(R^c)_u(R^d)_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^d$ is the same or different and is —O—, —NH—, —C≡C—, or a silane bond;

s, t and u are the same or different and are each 0 or 1;

v is an integer of 0 to 3;

n is an integer of 1 to 20;

in a case where n is 1, s+t+u is 3 and v is 0;

in a case where n is 2 to 20, s+t+u is the same or different and is 0 to 2, and v is the same or different and is 0 to 2; and in a case where v is an integer of 1 or more, at least two Si atoms are bonded to each other via $R^d$ in a linear, ladder, cyclic, or polycyclic form.

5. The surface-treating agent according to claim 1, wherein $X^1$ is a group represented by $-L^2-SiR^5{}_3$, $-L^2-Si(OR^6)_3$, $-L^2-Si(NR^6{}_2)_3$ or $-L^2-Si(OCOR^6)_3$ wherein $L^2$ is $—C_2H_4—$, $—C_3H_6—$, $—C_4H_8O—CH_2—$, $—COO—CH_2—CH(OH)—CH_2—$, $—CH_2—$, or $—C_4H_8—$;

$R^5$ is a halogen atom; and $R^6$ is independently an alkyl group having 1 to 4 carbon atoms.

6. The surface-treating agent according to claim 1, wherein $X^1$ is a silane-containing reactive crosslinkable group represented by the formula:

$$—L^2—\{Si(R^a)_s(R^b)_t(R^c)_u(R^{d'})_v\}_n$$

wherein $L^2$ is a single bond or a divalent linking group;

$R^a$, $R^b$ and $R^c$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, or a glycidyl group having 3 to 10 carbon atoms;

$R^{d'}$ are the same or different, and is a group represented by $—Z—SiR^{d1'}{}_{p'}R^{d2'}{}_{q'}R^{d3'}{}_{r'}$, wherein Z is the same or different and is a single bond or a divalent linking group;

$R^{d1'}$ is the same or different and is $R^{d''}$;

$R^{d''}$ has the same meaning as $R^{d'}$;

the number of Si atoms linearly linked via a Z group in $R^{d'}$ is at most 5;

$R^{d2'}$ is the same or different and is a hydroxyl group or a hydrolyzable group;

$R^{d3'}$ is the same or different and is a hydrogen atom or a lower alkyl group;

p' is the same or different and is an integer of 0 to 3;

q' is the same or different and is an integer of 0 to 3; and r' is the same or different and is an integer of 0 to 3;

provided that the sum of p', q' and r' is 3;

s, t and u are the same or different and are each 0 or 1;

v is an integer of 0 to 3; and n is an integer of 1 to 20.

7. The surface-treating agent according to claim 1, wherein $X^1$ is a silane-containing reactive crosslinkable group represented by the formula:

$$—L^6—\{C(R^{a6})_{s6}(R^{b6})_{t6}(R^{c6})_{u6}(R^{d6})_{v6}\}_{n6}$$

wherein $L^6$ is a single bond or a divalent linking group;

$R^{a6}$, $R^{b6}$ and $R^{c6}$ are the same or different and are each hydrogen, halogen, an alkoxy group having 1 to 10 carbon atoms, an amino group having 1 to 10 carbon atoms, an acetoxy group having 1 to 10 carbon atoms, an allyl group having 3 to 10 carbon atoms, a glycidyl group having 3 to 10 carbon atoms, $OCOR^{67}$, wherein $R^{67}$ is an alkyl group having 1 to 6 carbon atoms, OH or $—Y^6—SiR^{65}{}_{j6}R^{66}{}_{3-j6}$;

$R^{d6}$ is the same or different and is —O—, —NH—, —C≡C—, or —$Z^6$—$CR^{61}{}_{p6}R^{62}{}_{q6}R^{63}{}_{r6}$;

$Z^6$ is the same or different and is an oxygen atom or a divalent organic group;

wherein $R^{61}$ is the same or different and represents $R^{d6'}$;

$R^{d6'}$ has the same meaning as $R^{d6}$;

the number of C atoms linearly linked via a $Z^6$ group in $R^{d6}$ is at most 5;

$R^{62}$ is the same or different and is —$Y^6$—$SiR^{65}{}_{j6}R^{66}{}_{3-j6}$;

$Y^6$ is the same or different and is a divalent organic group;

$R^{65}$ is the same or different and is a hydroxyl group or a hydrolyzable group;

$R^{66}$ is the same or different and is a hydrogen atom or a lower alkyl group;

j6 with respect to each (—$Y^6$—$SiR^{65}{}_{j6}R^{66}{}_{3-j6}$) unit is independently an integer of 1 to 3;

$R^{63}$ is the same or different and is a hydrogen atom or a lower alkyl group;

p6 is the same or different and is an integer of 0 to 3;

q6 is the same or different and is an integer of 0 to 3;

r6 is the same or different and is an integer of 0 to 3; and s6, t6 and u6 are the same or different and are each 0 or 1, v6 is an integer of 0 to 3, and n6 is an integer of 1 to 20, provided that in the formula, at least two —$Y^6$—$SiR^{65}{}_{j6}R^{66}{}_{3-j6}$ are present.

8. The surface-treating agent according to claim 1, further comprising a solvent.

9. The surface-treating agent according to claim 1, for use as an antifouling coating agent or a water-proof coating agent.

10. The surface-treating agent according to claim 1, which is for vacuum deposition.

11. A pellet comprising the surface-treating agent according to claim 1.

12. An article comprising: a base material; and a layer formed on a surface of the base material from the surface-treating agent according to claim 1.

13. The article according to claim 12, wherein the article is an optical member.

14. The surface-treating agent according to claim 1, wherein n is 0.

15. The surface-treating agent according to claim 1, wherein l' is 3.

* * * * *